(12) United States Patent
Damnjanovic et al.

(10) Patent No.: US 11,611,916 B2
(45) Date of Patent: Mar. 21, 2023

(54) PRIMARY CELL AND PRIMARY SECONDARY CELL MANAGEMENT FOR CELLS WITHIN AN ACTIVATED CELL SET

(71) Applicant: QUALCOMM Incorporated, San Diego, CA (US)

(72) Inventors: Jelena Damnjanovic, Del Mar, CA (US); Tao Luo, San Diego, CA (US); Aleksandar Damnjanovic, Del Mar, CA (US); Junyi Li, Chester, NJ (US); Juan Montojo, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 286 days.

(21) Appl. No.: 17/112,931

(22) Filed: Dec. 4, 2020

(65) Prior Publication Data
US 2022/0182894 A1    Jun. 9, 2022

(51) Int. Cl.
*H04W 36/00*    (2009.01)
*H04W 36/08*    (2009.01)

(52) U.S. Cl.
CPC ....... *H04W 36/0061* (2013.01); *H04W 36/08* (2013.01)

(58) Field of Classification Search
CPC ............. H04W 36/0061; H04W 36/08; H04W 36/0069; Y02D 30/70
See application file for complete search history.

(56) References Cited

U.S. PATENT DOCUMENTS

2016/0338039 A1 *  11/2016  Van Der Velde ............................ H04W 74/0833
2018/0279182 A1 *  9/2018  Sang ................. H04W 36/0055

OTHER PUBLICATIONS

CMCC, "Discussion on intra-NR mobility", 3GPP TSG-RAN WG2 Meeting #95 bis, R2-167073, Oct. 10-14, 2016 (Year: 2016).*

* cited by examiner

*Primary Examiner* — Chi H Pham
*Assistant Examiner* — Ji-Hae Yea
(74) *Attorney, Agent, or Firm* — Holland & Hart LLP

(57) ABSTRACT

Methods, systems, and devices for wireless communications are described. Generally, the described techniques provide for using layer one (L1) or layer two (L2) signaling to indicate a primary cell (PCell) or primary secondary cell (PSCell) to a user equipment (UE). The use of L1 or L2 signaling to indicate a PCell or PSCell may be referred to as L1 or L2 mobility and may lower the latency at the UE associated with transitioning to communicating with the PCell or PSCell. A UE may receive radio resource control (RRC) signaling from a base station indicating a set of cells configured for L1 or L2 mobility and indicating a list of candidate cells for a PCell or PSCell. The UE may then receive L1/L2 signaling from the base station identifying the PCell or indicating activation of the PSCell.

30 Claims, 19 Drawing Sheets

US 11,611,916 B2

PRIMARY CELL AND PRIMARY SECONDARY CELL MANAGEMENT FOR CELLS WITHIN AN ACTIVATED CELL SET

FIELD OF TECHNOLOGY

The following relates to wireless communications, including primary cell (PCell) and primary secondary cell (PSCell) management for cells within an activated cell set.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support primary cell (PCell) and primary secondary cell (PSCell) management for cells within an activated cell set. Generally, the described techniques provide for using layer one (L1) or layer two (L2) signaling to indicate a PCell or PSCell to a UE. The use of L1/L2 signaling to indicate a PCell or PSCell may be referred to as L1/L2 mobility and may lower the latency at the UE associated with transitioning to communicating with the PCell or PSCell. A UE may receive radio resource control (RRC) signaling from a base station indicating a set of cells configured for L1/L2 mobility and indicating a list of candidate cells for a PCell or PSCell. The UE may then receive L1/L2 signaling from the base station identifying the PCell or indicating activation of the PSCell, and the UE may connect to the PCell or PSCell based on receiving the L1/L2 signaling.

A method for wireless communication at a user equipment (UE) is described. The method may include receiving radio resource control signaling from a base station indicating a set of cells configured for layer one or layer two mobility and indicating a list of candidate cells for a primary cell from the set of cells, receiving layer one or layer two signaling from the base station identifying the primary cell from the list of candidate cells, and communicating with the primary cell based on receiving the layer one or layer two signaling.

An apparatus for wireless communication at a UE is described. The apparatus may include a processor, memory in electronic communication with the processor, and instructions stored in the memory. The instructions may be executable by the processor to cause the apparatus to receive radio resource control signaling from a base station indicating a set of cells configured for layer one or layer two mobility and indicating a list of candidate cells for a primary cell from the set of cells, receive layer one or layer two signaling from the base station identifying the primary cell from the list of candidate cells, and communicate with the primary cell based on receiving the layer one or layer two signaling.

Another apparatus for wireless communication at a UE is described. The apparatus may include means for receiving radio resource control signaling from a base station indicating a set of cells configured for layer one or layer two mobility and indicating a list of candidate cells for a primary cell from the set of cells, means for receiving layer one or layer two signaling from the base station identifying the primary cell from the list of candidate cells, and means for communicating with the primary cell based on receiving the layer one or layer two signaling.

A non-transitory computer-readable medium storing code for wireless communication at a UE is described. The code may include instructions executable by a processor to receive radio resource control signaling from a base station indicating a set of cells configured for layer one or layer two mobility and indicating a list of candidate cells for a primary cell from the set of cells, receive layer one or layer two signaling from the base station identifying the primary cell from the list of candidate cells, and communicate with the primary cell based on receiving the layer one or layer two signaling.

Some examples of the method, apparatuses, and non-transitory computer-readable medium described herein may further include operations, features, means, or instructions for receiving, in the radio resource control signaling, an indication of a primary distributed unit that supports the primary cell, where receiving the layer one or layer two signaling identifying the primary cell includes receiving, from the primary distributed unit, the layer one or layer two signaling identifying the primary cell from the list of candidate cells.

Some examples of the method, apparatuses, and non-transitory computer-readable medium described herein may further include operations, features, means, or instructions for receiving, in the layer one or layer two signaling, an indication of a primary distributed unit that supports the primary cell, where receiving the layer one or layer two signaling identifying the primary cell includes receiving, from the primary distributed unit, the layer one or layer two signaling identifying the primary cell from the list of candidate cells.

In some examples of the method, apparatuses, and non-transitory computer-readable medium described herein, the primary cell includes a first primary cell, the layer one or layer two signaling includes first layer one or layer two signaling, and the method, apparatuses, and non-transitory computer-readable medium may include further operations, features, means, or instructions for receiving second layer one or layer two signaling triggering a handover to a second primary cell that may be a member of the set of cells configured for layer one or layer two mobility and performing the handover to the second primary cell based on receiving the second layer one or layer two signaling.

In some examples of the method, apparatuses, and non-transitory computer-readable medium described herein, the primary cell includes a first primary cell and the method, apparatuses, and non-transitory computer-readable medium may include further operations, features, means, or instructions for receiving layer three signaling triggering a handover to a second primary cell that may be a non-member of the set of cells configured for layer one or layer two mobility and performing the handover to the second primary cell based on receiving the layer three signaling.

In some examples of the method, apparatuses, and non-transitory computer-readable medium described herein, the radio resource control signaling includes first radio resource control signaling and the method, apparatuses, and non-transitory computer-readable medium may include further operations, features, means, or instructions for receiving second radio resource control signaling indicating an updated set of cells configured for layer one or layer two mobility based on performing the handover.

In some examples of the method, apparatuses, and non-transitory computer-readable medium described herein, a first cell in the set of cells configured for layer one or layer two mobility may be supported by a first distributed unit at the base station, a second cell in the set of cells configured for layer one or layer two mobility may be supported by a second distributed unit at the base station, and the first distributed unit and the second distributed unit may be supported by a same central unit at the base station.

A method for wireless communication at a base station is described. The method may include transmitting radio resource control signaling to a UE indicating a set of cells configured for layer one or layer two mobility and indicating a list of candidate cells for a primary cell from the set of cells, transmitting layer one or layer two signaling to the UE identifying the primary cell from the list of candidate cells, and communicating with the UE via the primary cell based on transmitting the layer one or layer two signaling.

An apparatus for wireless communication at a base station is described. The apparatus may include a processor, memory in electronic communication with the processor, and instructions stored in the memory. The instructions may be executable by the processor to cause the apparatus to transmit radio resource control signaling to a UE indicating a set of cells configured for layer one or layer two mobility and indicating a list of candidate cells for a primary cell from the set of cells, transmit layer one or layer two signaling to the UE identifying the primary cell from the list of candidate cells, and communicate with the UE via the primary cell based on transmitting the layer one or layer two signaling.

Another apparatus for wireless communication at a base station is described. The apparatus may include means for transmitting radio resource control signaling to a UE indicating a set of cells configured for layer one or layer two mobility and indicating a list of candidate cells for a primary cell from the set of cells, means for transmitting layer one or layer two signaling to the UE identifying the primary cell from the list of candidate cells, and means for communicating with the UE via the primary cell based on transmitting the layer one or layer two signaling.

A non-transitory computer-readable medium storing code for wireless communication at a base station is described. The code may include instructions executable by a processor to transmit radio resource control signaling to a UE indicating a set of cells configured for layer one or layer two mobility and indicating a list of candidate cells for a primary cell from the set of cells, transmit layer one or layer two signaling to the UE identifying the primary cell from the list of candidate cells, and communicate with the UE via the primary cell based on transmitting the layer one or layer two signaling.

Some examples of the method, apparatuses, and non-transitory computer-readable medium described herein may further include operations, features, means, or instructions for transmitting, in the radio resource control signaling, an indication of a primary distributed unit that supports the primary cell, where transmitting the layer one or layer two signaling identifying the primary cell includes transmitting, via the primary distributed unit to the UE, the layer one or layer two signaling identifying the primary cell from the list of candidate cells.

Some examples of the method, apparatuses, and non-transitory computer-readable medium described herein may further include operations, features, means, or instructions for exchanging signaling between a set of multiple distributed units at the base station and identifying a primary distributed unit for the UE based on the exchanging, where the primary distributed unit supports the primary cell. In some examples of the method, apparatuses, and non-transitory computer-readable medium described herein, the signaling exchanged between the set of multiple distributed units at the base station includes layer one measurements, a coverage area of each distributed unit, a predicted position of the UE, a load of each distributed unit, or a combination thereof.

Some examples of the method, apparatuses, and non-transitory computer-readable medium described herein may further include operations, features, means, or instructions for transmitting, in the layer one or layer two signaling to the UE, an indication of the primary distributed unit that supports the primary cell, where transmitting the layer one or layer two signaling identifying the primary cell includes transmitting, via the primary distributed unit to the UE, the layer one or layer two signaling identifying the primary cell from the list of candidate cells.

In some examples of the method, apparatuses, and non-transitory computer-readable medium described herein, the primary cell includes a first primary cell, the layer one or layer two signaling comprises first layer one or layer two signaling, and the method, apparatuses, and non-transitory computer-readable medium may include further operations, features, means, or instructions for transmitting second layer one or layer two signaling triggering a handover to a second primary cell that may be a member of the set of cells configured for layer one or layer two mobility.

In some examples of the method, apparatuses, and non-transitory computer-readable medium described herein, the primary cell includes a first primary cell and the method, apparatuses, and non-transitory computer-readable medium may include further operations, features, means, or instructions for transmitting layer three signaling triggering a handover to a second primary cell that may be a non-member of the set of cells configured for layer one or layer two mobility.

In some examples of the method, apparatuses, and non-transitory computer-readable medium described herein, the radio resource control signaling includes first radio resource control signaling and the method, apparatuses, and non-transitory computer-readable medium may include further operations, features, means, or instructions for transmitting second radio resource control signaling indicating an updated set of cells configured for layer one or layer two mobility based on triggering the handover.

In some examples of the method, apparatuses, and non-transitory computer-readable medium described herein, a first cell in the set of cells configured for layer one or layer two mobility may be supported by a first distributed unit at the base station, a second cell in the set of cells configured for layer one or layer two mobility may be supported by a second distributed unit at the base station, and the first distributed unit and the second distributed unit may be supported by a same central unit at the base station.

A method for wireless communication at a UE is described. The method may include receiving radio resource control signaling from a base station indicating a set of cells configured for layer one or layer two mobility and indicating a list of candidate cells for a primary secondary cell from the set of cells, receiving layer one or layer two signaling indicating activation of the primary secondary cell from the list of candidate cells, and transmitting control information in a first control channel to the primary secondary cell, where the control information in the first control channel is associated with a first subset of the set of cells linked to a same distributed unit as the primary secondary cell.

An apparatus for wireless communication at a UE is described. The apparatus may include a processor, memory in electronic communication with the processor, and instructions stored in the memory. The instructions may be executable by the processor to cause the apparatus to receive radio resource control signaling from a base station indicating a set of cells configured for layer one or layer two mobility and indicating a list of candidate cells for a primary secondary cell from the set of cells, receive layer one or layer two signaling indicating activation of the primary secondary cell from the list of candidate cells, and transmit control information in a first control channel to the primary secondary cell, where the control information in the first control channel is associated with a first subset of the set of cells linked to a same distributed unit as the primary secondary cell.

Another apparatus for wireless communication at a UE is described. The apparatus may include means for receiving radio resource control signaling from a base station indicating a set of cells configured for layer one or layer two mobility and indicating a list of candidate cells for a primary secondary cell from the set of cells, means for receiving layer one or layer two signaling indicating activation of the primary secondary cell from the list of candidate cells, and means for transmitting control information in a first control channel to the primary secondary cell, where the control information in the first control channel is associated with a first subset of the set of cells linked to a same distributed unit as the primary secondary cell.

A non-transitory computer-readable medium storing code for wireless communication at a UE is described. The code may include instructions executable by a processor to receive radio resource control signaling from a base station indicating a set of cells configured for layer one or layer two mobility and indicating a list of candidate cells for a primary secondary cell from the set of cells, receive layer one or layer two signaling indicating activation of the primary secondary cell from the list of candidate cells, and transmit control information in a first control channel to the primary secondary cell, where the control information in the first control channel is associated with a first subset of the set of cells linked to a same distributed unit as the primary secondary cell.

In some examples of the method, apparatuses, and non-transitory computer-readable medium described herein, receiving the layer one or layer two signaling indicating activation of the primary secondary cell may include operations, features, means, or instructions for receiving layer one or layer two signaling identifying the primary secondary cell from the list of candidate cells. Some examples of the method, apparatuses, and non-transitory computer-readable medium described herein may further include operations, features, means, or instructions for identifying the primary secondary cell from the list of candidate cells based on one or more rules. In some examples of the method, apparatuses, and non-transitory computer-readable medium described herein, the one or more rules indicate that the primary secondary cell corresponds to a cell in the list of candidate cells with a defined cell identifier or a defined priority.

Some examples of the method, apparatuses, and non-transitory computer-readable medium described herein may further include operations, features, means, or instructions for transmitting control information in a second control channel to another cell in the set of cells, where the control information in the second control channel may be associated with a second subset of the set of cells linked to the same distributed unit as the primary secondary cell. In some examples of the method, apparatuses, and non-transitory computer-readable medium described herein, the first subset of the set of cells for which control information may be transmitted in the first control channel overlaps with the second subset of the set of cells for which control information may be transmitted in the second control channel. In some examples of the method, apparatuses, and non-transitory computer-readable medium described herein, the first subset of the set of cells for which control information may be transmitted in the first control channel may be non-overlapping with the second subset of the set of cells for which control information may be transmitted in the second control channel.

A method for wireless communication at a base station is described. The method may include transmitting radio resource control signaling to a UE indicating a set of cells configured for layer one or layer two mobility and indicating a list of candidate cells for a primary secondary cell from the set of cells, transmitting layer one or layer two signaling indicating activation of the primary secondary cell from the list of candidate cells, and receiving control information in a first control channel via the primary secondary cell, where the control information in the first control channel is associated with a first subset of the set of cells linked to a same distributed unit as the primary secondary cell.

An apparatus for wireless communication at a base station is described. The apparatus may include a processor, memory in electronic communication with the processor, and instructions stored in the memory. The instructions may be executable by the processor to cause the apparatus to transmit radio resource control signaling to a UE indicating a set of cells configured for layer one or layer two mobility and indicating a list of candidate cells for a primary secondary cell from the set of cells, transmit layer one or layer two signaling indicating activation of the primary secondary cell from the list of candidate cells, and receive control information in a first control channel via the primary secondary cell, where the control information in the first control channel is associated with a first subset of the set of cells linked to a same distributed unit as the primary secondary cell.

Another apparatus for wireless communication at a base station is described. The apparatus may include means for transmitting radio resource control signaling to a UE indicating a set of cells configured for layer one or layer two mobility and indicating a list of candidate cells for a primary secondary cell from the set of cells, means for transmitting layer one or layer two signaling indicating activation of the primary secondary cell from the list of candidate cells, and means for receiving control information in a first control channel via the primary secondary cell, where the control information in the first control channel is associated with a first subset of the set of cells linked to a same distributed unit as the primary secondary cell.

A non-transitory computer-readable medium storing code for wireless communication at a base station is described. The code may include instructions executable by a processor to transmit radio resource control signaling to a UE indicating a set of cells configured for layer one or layer two mobility and indicating a list of candidate cells for a primary secondary cell from the set of cells, transmit layer one or layer two signaling indicating activation of the primary secondary cell from the list of candidate cells, and receive control information in a first control channel via the primary secondary cell, where the control information in the first control channel is associated with a first subset of the set of cells linked to a same distributed unit as the primary secondary cell.

Some examples of the method, apparatuses, and non-transitory computer-readable medium described herein may further include operations, features, means, or instructions for transmitting layer one or layer two signaling identifying the primary secondary cell from the list of candidate cells. In some examples of the method, apparatuses, and non-transitory computer-readable medium described herein, identifying the primary secondary cell from the list of candidate cells may include operations, features, means, or instructions for identifying the primary secondary cell from the list of candidate cells based on one or more rules. In some examples of the method, apparatuses, and non-transitory computer-readable medium described herein, the one or more rules indicate that the primary secondary cell corresponds to a cell in the list of candidate cells with a defined cell identifier or a defined priority.

Some examples of the method, apparatuses, and non-transitory computer-readable medium described herein may further include operations, features, means, or instructions for receiving control information in a second control channel via another cell in the set of cells, where the control information in the second control channel may be associated with a second subset of the set of cells linked to the same distributed unit as the primary secondary cell. In some examples of the method, apparatuses, and non-transitory computer-readable medium described herein, the first subset of the set of cells for which control information may be transmitted in the first control channel overlaps with the second subset of the set of cells for which control information may be transmitted in the second control channel. In some examples of the method, apparatuses, and non-transitory computer-readable medium described herein, the first subset of the set of cells for which control information may be transmitted in the first control channel may be non-overlapping with the second subset of the set of cells for which control information may be transmitted in the second control channel.

DETAILED DESCRIPTION

In some wireless communications systems, a user equipment (UE) may support communications with one or more cells at one or more base stations. In such systems, if channel conditions change (e.g., due to the UE moving further away from a cell), it may be appropriate for the UE to perform a handover to a different cell (e.g., that provides better coverage to the UE). As such, a base station may transmit layer three (L3) signaling (e.g., radio resource control signaling) to the UE to trigger the handover. The use of L3 signaling to facilitate handovers across cells may be referred to as L3 mobility. Because L3 mobility involves RRC signaling, L3 mobility may cause considerable delays in processing and signaling. As a result, the latency associated with performing a handover (i.e., using L3 mobility) may be high, which may be detrimental to communications in a wireless communications system (e.g., especially in systems where a UE performs frequent handovers).

The present disclosure provides techniques for facilitating L1/L2 mobility to limit the latency associated with performing handovers in a wireless communications system. In particular, a base station may use layer one (L1) or layer two (L2) signaling to trigger a handover at a UE from one cell to another. The use of L1/L2 signaling to facilitate handovers across cells may be referred to as L1/L2 mobility. A base station and a UE may use L1/L2 mobility for primary cell (PCell) management and primary secondary cell (PS-Cell) management. The base station may transmit L3 signaling to the UE indicating a set of cells activated for L1/L2 mobility. The set of cells activated for L1/L2 mobility may be referred to as an L1/L2 activated cell set. Accordingly, the base station may use L1/L2 signaling to trigger a handover from a first cell in the L1/L2 activated cell set to a second cell in the L1/L2 activated cell set. For example, the base station may use L1/L2 signaling to indicate a PCell or PSCell to a UE, and the UE may connect to the indicated PCell or PSCell.

Aspects of the disclosure introduced above are described below in the context of a wireless communications system. Examples of processes and signaling exchanges that support PCell and PSCell management for cells within an activated cell set are then described. Aspects of the disclosure are further illustrated by and described with reference to apparatus diagrams, system diagrams, and flowcharts that relate to PCell and PSCell management for cells within an activated cell set.

Figure 1:
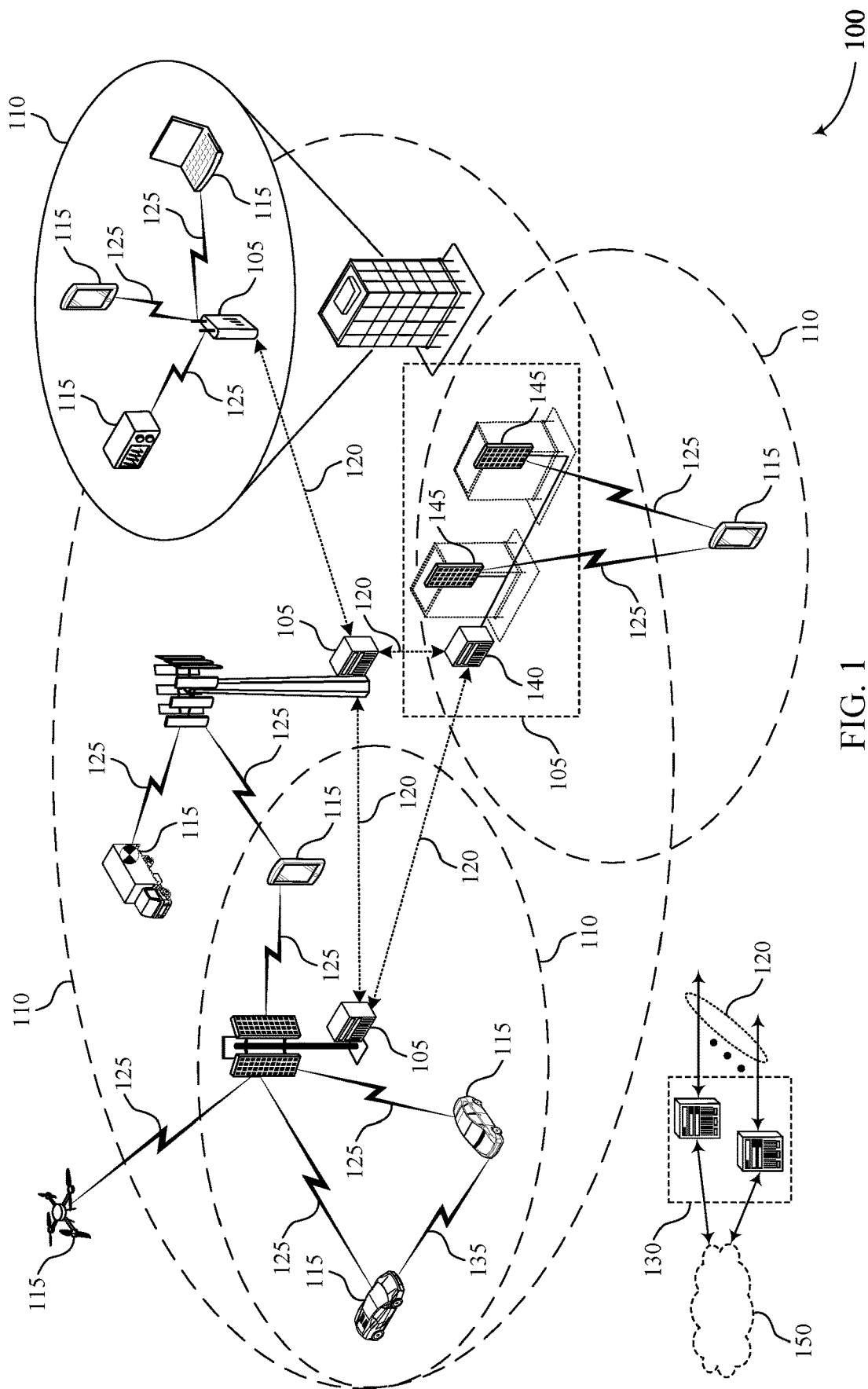
FIG. 1 illustrates an example of a wireless communications system that supports primary cell (PCell) and primary secondary cell (PSCell) management for cells within an activated cell set in accordance with aspects of the present disclosure.

FIG. 1 illustrates an example of a wireless communications system 100 that supports PCell and PSCell management for cells within an activated cell set in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105 (e.g., in a physical uplink shared channel (PUSCH) or a physical uplink control channel (PUCCH)), or downlink transmissions from a base station 105 to a UE 115 (e.g., in a physical downlink shared channel (PDSCH) or a physical downlink control channel (PDCCH)). Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may include a packet-based network that operates according to a layered protocol stack. The layered protocol stack may include an RRC layer, Packet Data Convergence Protocol (PDCP) layer, Radio Link Control (RLC) layer, Medium Access Control (MAC) layer, and a physical (PHY) layer. L3 of the protocol stack may include an RRC layer, L2 may include a PDCP layer, RLC layer, and a MAC layer, and L1 may include a PHY layer. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

In wireless communications system 100, the protocol stack layers described above may be split into different units. For example, a base station 105 may include control units (CUs), distributed units (DUs), radio units (RUs), or a combination thereof, and each CU, DU, or RU may include one or more of the protocol stack layers described above.

Figure 2:
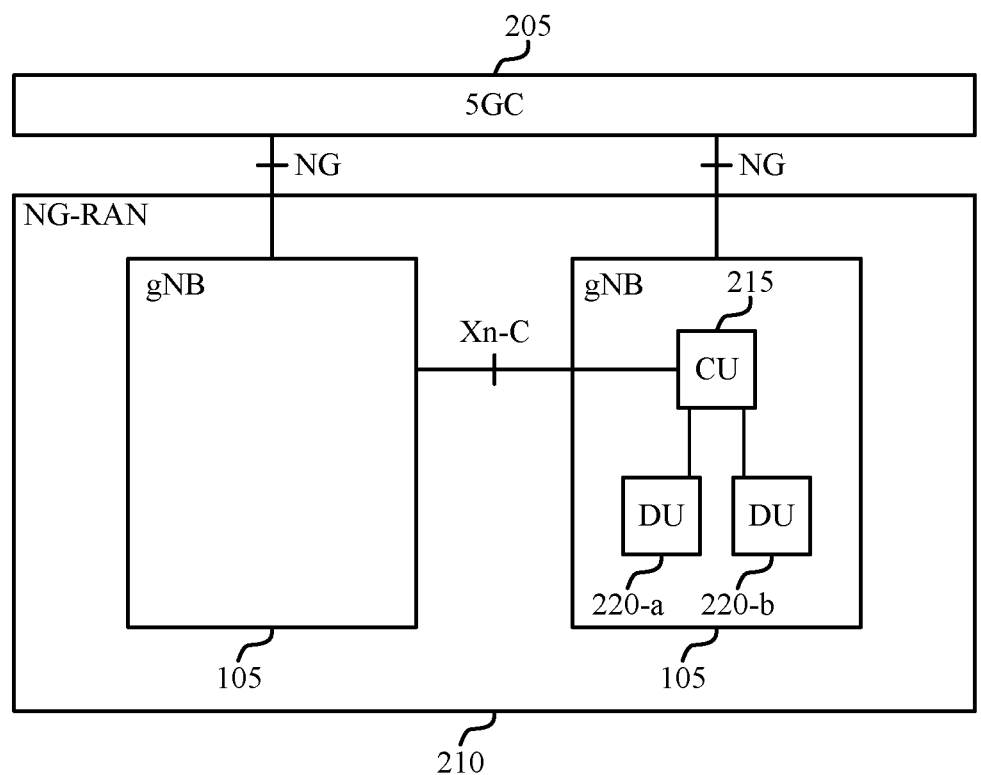
FIG. 2 illustrates an example of a network architecture that supports PCell and PSCell management for cells within an activated cell set in accordance with aspects of the present disclosure.

FIG. 2 illustrates an example of a network architecture 200 that supports PCell and PSCell management for cells within an activated cell set in accordance with aspects of the present disclosure. In the example of FIG. 2, a core network 205 (e.g., a 5G core network (5GC)) may communicate with a radio access network (RAN) 210 (e.g., next-generation (NG) RAN (NG-RAN)) over an NG interface. The RAN 210 may include base stations 105 that may communicate with each other over an Xn-C interface. Each base station 105 may include a CU 215 and multiple DUs 220 (e.g., a DU 220-*a* and a DU 220-*b*). The CU 215 may be a logical node hosting RRC, Service Data Adaptation Protocol (SDAP), and PDCP protocols of the base station 105. The CU 215 at the base station 105 may also control the operation of one or more DUs 220 at the base station 105 and may terminate an F1 interface connected with each DU 220 of the one or more DUs 220. The DU 220 may be a logical node hosting RLC, MAC, and PHY layers of the base station 105, and the operation of the DU 220 may be controlled by the CU 215. Each DU 220 may support one or multiple cells, where each cell is supported by a single DU 220. The DU 220 also terminates an F1 interface connected with a CU 215.

Figure 3:
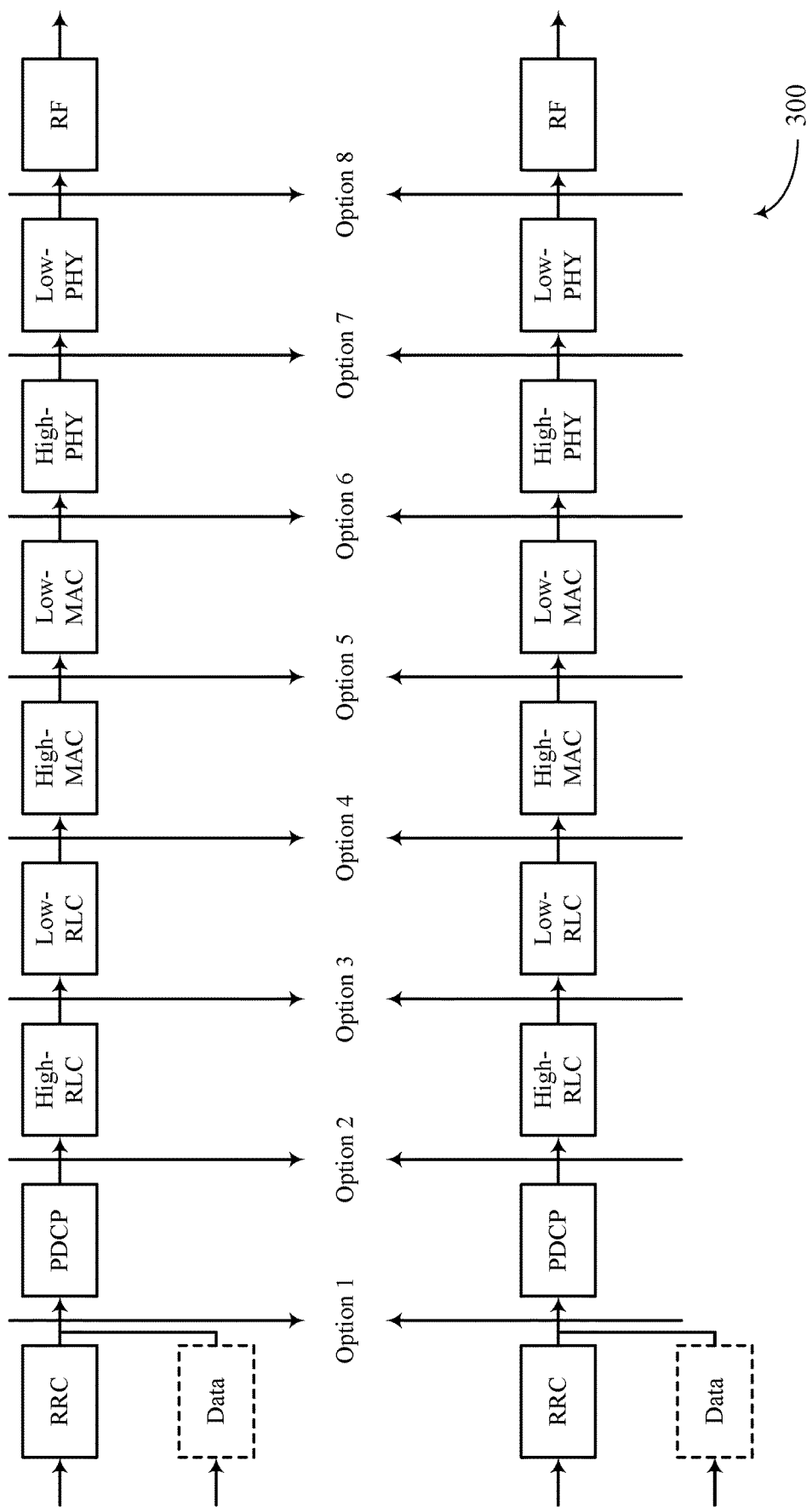
FIG. 3 illustrates an example of different split options for protocol stack layers at control units (CUs) and distributed units (DUs) at a base station in accordance with aspects of the present disclosure.

FIG. 3 illustrates an example of different split options 300 for protocol stack layers at CUs and DUs at a base station 105 in accordance with aspects of the present disclosure. For example, option 1 provides an example of a protocol stack layer split where a CU includes an RRC layer and a DU includes a PDCP layer, high RLC layer, low RLC layer, high MAC layer, low MAC layer, high PHY layer, low PHY layer, and a radio frequency layer; option 2 provides an example of a protocol stack layer split where a CU includes an RRC layer and a PDCP layer and a DU includes a high RLC layer, low RLC layer, high MAC layer, low MAC layer, high PHY layer, low PHY layer, and a radio frequency layer; and so forth. In some cases, a base station 105 in wireless communications system 100 may also include RUs. In such cases, the protocol stack layers may be split such that a PHY layer is in an RU (e.g., a high PHY layer and a low PHY layer in an RU) or partially in both an RU and a DU (e.g., a high PHY layer in a DU and a low PHY layer in an RU). For example, a CU may contain an RRC and PDCP layer, a DU may contain an RLC and MAC layer, and an RU may contain a PHY layer. Alternatively, a CU may contain an RRC and PDCP layer, a DU may contain an RLC, MAC, and high PHY layer, and an RU may contain a low PHY layer.

Figure 4:
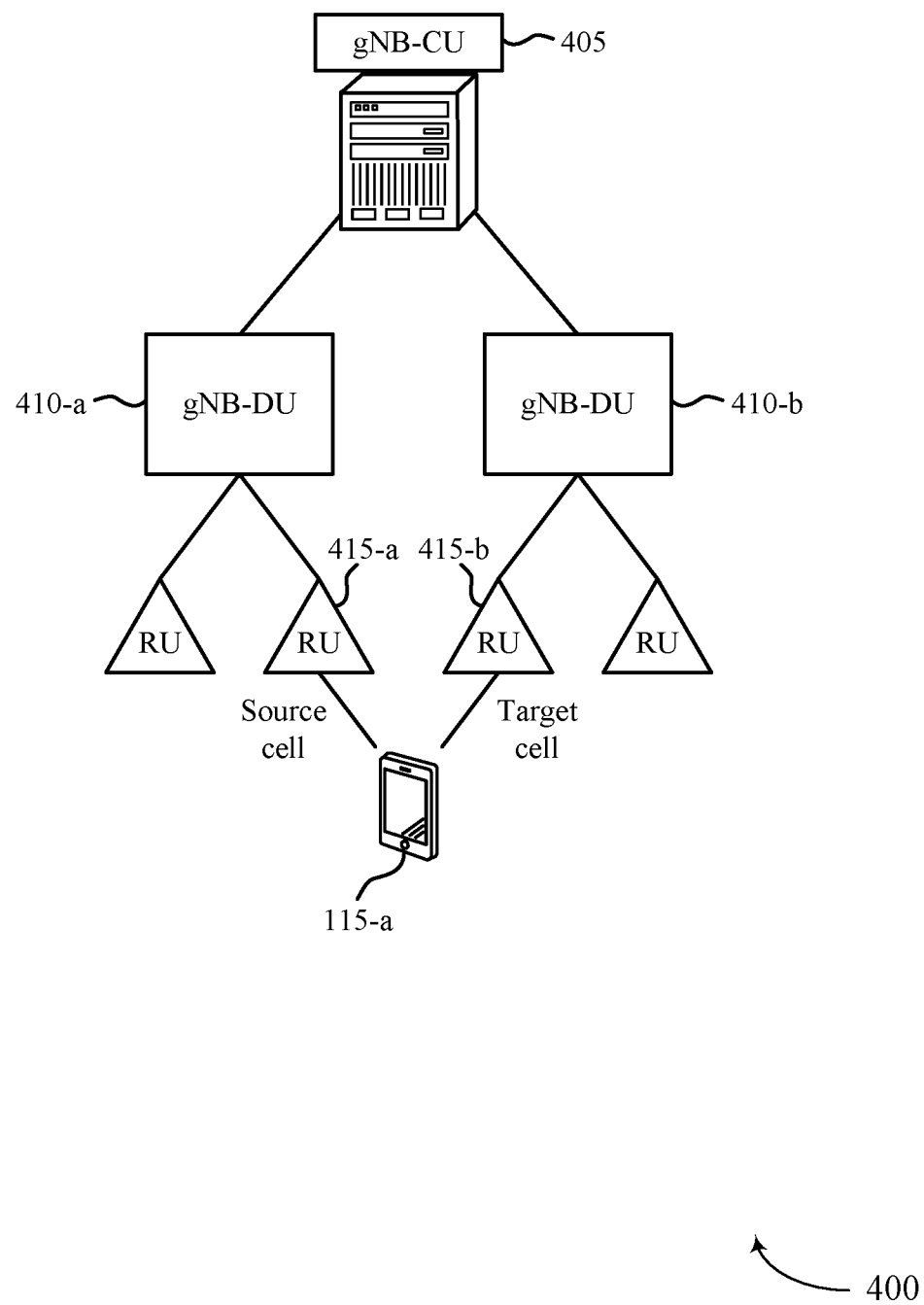
FIG. 4 illustrates an example of a wireless communications system in which a user equipment (UE) supports communications with cells supported by different DUs under a same CU in accordance with aspects of the present disclosure.

In some aspects, a UE 115 may support communications with cells supported by different DUs under the same CU (e.g., in accordance with each of the examples described with reference to FIGS. 1-3). For example, the UE 115 may communicate with cells that have non-collocated PHY, MAC, and RLC layers and common PDCP and RRC layers. FIG. 4 illustrates an example of a wireless communications system 400 in which a UE 115 supports communications with cells supported by different DUs under the same CU in accordance with aspects of the present disclosure. In the example of FIG. 4, a base station 105 may include a CU 405 supporting a first DU 410-a and a second DU 410-b, and each DU 410 may support one or more cells 415. In some cases, after connecting and communicating with a source cell 415-a, it may be appropriate for the base station 105 to handover the UE 115-a to a target cell 415-b. That is, the UE 115 may perform a handover from the source cell 415-a supported by the first DU 410-a to the target cell 415-b supported by the second DU 410-b. The UE 115 may also support communications with cells supported by the same DU under the same CU.

In some systems, although the UE 115 may be performing the handover across cells supported by the same CU, where the CU includes the same L3 protocols (e.g., a same RRC layer), a base station 105 may still use L3 signaling to trigger handovers across these cells. The use of L3 signaling to facilitate handovers across cells may be referred to as L3 mobility. Because L3 mobility involves RRC signaling however, L3 mobility may cause considerable delays in processing and signaling. As a result, the latency associated with performing a handover procedure (i.e., using L3 mobility) may be high. For example, the latency associated with indicating a PCell or PSCell to a UE (e.g., a new PCell or PSCell) may be high, which may be detrimental to communications in a wireless communications system. As described herein, the wireless communications system 100 may support efficient techniques for facilitating L1/L2 mobility to limit the latency associated with PCell and PSCell management.

Figure 5:
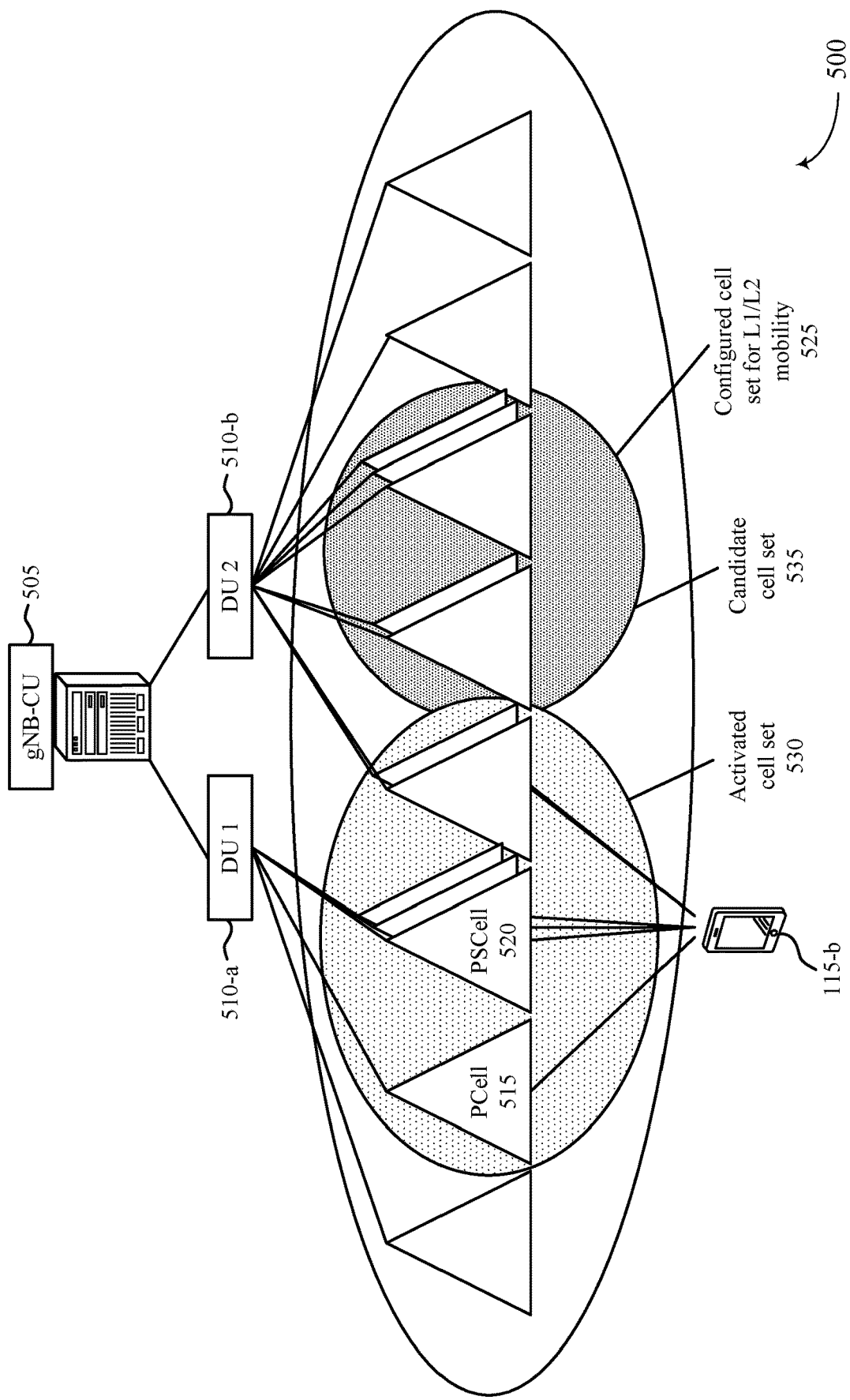
FIG. 5 illustrates an example of a wireless communications system that supports PCell and PSCell management for cells within an activated cell set in accordance with aspects of the present disclosure.

FIG. 5 illustrates an example of a wireless communications system 500 that supports PCell and PSCell management for cells within an activated cell set in accordance with aspects of the present disclosure. Wireless communications system 500 includes a UE 115-b, which may be an example of a UE 115 described with reference to FIGS. 1-4. Wireless communications system 500 also includes a base station 105 supporting a CU 505, DU 510-a, and a DU 510-b. The DUs 510 may support multiple cells, including a PCell 515 and a PSCell 520, and the UE 115-b may communicate with the base station 105 via one or more of the multiple cells. The wireless communications system 500 may implement aspects of the wireless communications system 100. For example, the wireless communications system 500 may support efficient techniques for facilitating L1/L2 mobility to limit the latency associated with PCell and PSCell management.

In the example of FIG. 5, the base station 105 may transmit RRC signaling to the UE 115-b configuring a set of cells for L1/L2 mobility. The configured set of cells for L1/L2 mobility may be referred to as an L1/L2 configured cell set. Each DU 510 supported by the base station 105 may have its own L1/L2 configured cell set, and the union of all configured cell sets across DUs 510 supported by the CU 505 may constitute an overall L1/L2 configured cell set. The configured cell set 525 for L1/L2 mobility in FIG. 5 may be an example of an overall L1/L2 configured cell set. In some cases, the RRC signaling may indicate, to the UE 115-b, an L1/L2 configured cell set supported by each DU 510. In other cases, the RRC signaling may indicate, to the UE 115-b, the overall L1/L2 configured cell set supported by all DUs 510.

The RRC signaling may also indicate an L1/L2 activated cell set. The L1/L2 activated cell set may refer to a group of cells in a configured cell set that are activated and managed by L1/L2 signaling. Cells in the L1/L2 activated cell set may be used for control and data communications. Further, each DU 510 supported by the base station 105 may have its own L1/L2 activated cell set, and the union of all activated cell sets across DUs 510 may constitute an overall L1/L2 activated cell set. The activated cell set 530 in FIG. 5 may be an example of an overall L1/L2 activated cell set. In some cases, the RRC signaling may indicate, to the UE 115-b, an L1/L2 activated cell set supported by each DU 510. In other cases, the RRC signaling may indicate, to the UE 115-b, the overall L1/L2 activated cell set supported by all DUs 510.

The RRC signaling may also indicate an L1/L2 deactivated cell set. The L1/L2 deactivated cell set may refer to a group of cells in the configured cell set that are deactivated and managed by L1/L2 signaling. Cells in the L1/L2 deactivated cell set may not be used for control and data communications and can be activated by L1/L2 signaling. Further, each DU 510 supported by the base station 105 may have its own L1/L2 deactivated cell set, and the union of all deactivated cell sets across DUs 510 may constitute an overall L1/L2 deactivated cell set. In some cases, the RRC signaling may indicate to the UE 115-b, an L1/L2 deactivated cell set supported by each DU 510. In other cases, the RRC signaling may indicate, to the UE 115-b, the overall L1/L2 deactivated cell set supported by all DUs 510.

The RRC signaling may also indicate an L1/L2 candidate cell set. The L1/L2 candidate cell set may refer to a group of cells in a deactivated cell set that can be autonomously added to the activated cell set by the UE 115-b. Each DU 510 supported by the base station 105 may have its own L1/L2 candidate cell set, and the union of all candidate cell sets across DUs 510 may constitute an overall L1/L2 candidate cell set. The candidate cell set 535 in FIG. 5 may be an example of an overall L1/L2 candidate cell set. In some cases, the RRC signaling may indicate, to the UE 115-b, an L1/L2 candidate cell set supported by each DU 510. In other cases, the RRC signaling may indicate, to the UE 115-b, the overall L1/L2 candidate cell set supported by all DUs 510.

In addition to indicating the configured cell set 525 for L1/L2 mobility, the activated cell set 530, the deactivated cell set, and the candidate cell set 535, the RRC signaling may also indicate a list of candidate cells for a PCell in the configured cell set 525 (e.g., and in the activated cell set 530) and a list of candidate cells for a PSCell in the configured cell set 525 (e.g., and in the activated cell set 530). Once the UE 115-b receives the RRC signaling from the base station 105, the UE 115 may identify the configured cell set 525 for L1/L2 mobility, the activated cell set 530, the candidate cell set 535, the list of candidate cells for the PCell, and the list of candidate cells for the PSCell.

The base station 105 may then use L1/L2 signaling to manage PCells within the configured cell set 525 for L1/L2 mobility. In particular, the base station 105 may use L1/L2 signaling to indicate (e.g., set) a PCell 515 from the list of candidate cells for the PCell (e.g., the preconfigured options for the PCell) within the activated cell set 530 of a serving DU. The DU controlling the PCell 515 may be referred to as a primary DU (e.g., DU 510-a).

In some cases, the primary DU may be set and managed by the RRC protocol layer at the base station 105 (e.g., involving L3 signaling and L3 measurements). In such cases, the PCell 515 within the primary DU may be changed by L1/L2 signaling. That is, the base station 105 may transmit RRC signaling to the UE 115-*b* indicating the primary DU, and the base station 105 may transmit L1/L2 signaling (e.g., via the primary DU) identifying the PCell 515.

In other cases, the primary DU may be coordinated among the serving DUs 510. For instance, the serving DUs may exchange L1 measurements, DU coverage areas, UE predicted movements or positions, or the loading of the DUs. The base station 105 may then select the primary DU based on the coordination or communication among the serving DUs. In some examples, the base station 105 may then transmit L1/L2 signaling to the UE 115-*b* indicating the primary DU and the PCell 515. In other examples, the base station 105 may avoid indicating the primary DU to the UE 115-*b* (e.g., the primary DU concept may be transparent to the UE 115-*b*). In such examples, the PCell 515 may be managed by L1/L2 signaling from any of the serving DUs 510. Further, the serving DUs may coordinate to determine at which point a PCell 515 from one serving DU is to be substituted by a PCell from another serving DU (e.g., DU 510-*b*).

Once the UE 115-*b* receives the L1/L2 signaling indicating or identifying the PCell 515, the UE 115-*b* may establish a connection with the PCell 515 and may communicate with the PCell 515. In some cases, it may also be appropriate for a change in the PCell to be communicated to the CU. Thus, in addition to transmitting L1/L2 signaling indicating or identifying the PCell 515, one of the serving DUs (e.g., the primary DU) may send an indication of the PCell 515 to the CU 505.

In some aspects, after communicating with the PCell 515 for some time, the base station 105 may determine to trigger a handover at the UE 115-*b* to another PCell (e.g., due to a change in channel conditions). The PCell 515 to which the UE 115-*b* is connected may be referred to as a first PCell or a source PCell, and the other PCell to which the UE 115-*b* is to perform the handover may be referred to as a second PCell or a target PCell. If the second PCell is a member of the configured cell set 525 for L1/L2 mobility, the base station 105 may transmit L1/L2 signaling to the UE 115-*b* triggering the handover to the second PCell. Alternatively, if the second PCell is a non-member of the configured cell set 525 for L1/L2 mobility, the base station 105 may transmit L3 signaling to the UE 115-*b* triggering the handover to the second PCell. That is, L3 mobility may be used for a PCell change (e.g., L3 handover) when a new PCell is not from the configured cell set 525 for L1/L2 mobility. If L3 mobility is used for the PCell change, the base station 105 may transmit RRC signaling at L3 handover to update the set of cells configured for L1/L2 mobility (e.g., to update the configured cell set 525).

The base station 105 may also use L1/L2 signaling to manage PSCells within the configured set 525 for L1/L2 mobility. In particular, the base station 105 may use L1/L2 signaling to indicate activation of a PSCell 520 from the list of candidate cells for the PSCell (e.g., the preconfigured options for the PSCell). In the example of FIG. 5, the PSCell 520 may support communications with the UE 115-*b* on three (3) carriers and may be illustrated as three cells. The PSCell 520 may correspond to a designated cell for PUCCH to carry L1 control information for cells served by the same DU 510. That is, the UE 115-*b* may transmit control information in a PUCCH to a PSCell 520 if the control information is associated with a cell supported by the same DU as the PSCell 520. Thus, cells within the same DU may be preconfigured with the PUCCH at the PSCell 520, and the PSCell 520 may be activated or deactivated by L1/L2 signaling from a DU 510.

In some cases, the base station 105 may transmit, and the UE 115-*b* may receive, L1/L2 signaling via the DU 510 explicitly identifying a PSCell 520 for the DU 510. In other cases, the base station 105 may transmit, and the UE 115-*b* may receive, L1/L2 signaling implicitly identifying the PSCell 520 for the DU 510. In such cases, the L1/L2 signaling may indicate activation of the PSCell 520, and the UE 115-*b* may be configured to identify the PSCell 520 based on one or more rules. The rules may indicate that the PSCell 520 corresponds to a cell with a defined cell ID (e.g., lowest cell ID), defined RRC preconfigured priority (e.g., highest priority), etc. For example, the cell with the lowest cell ID, highest priority, etc. among the PUCCH preconfigured activated cells (e.g., list of candidate PSCells) within a DU (e.g., controlling DU that controls one or more cells) may have the activated PUCCH.

In some aspects, rather than a single PSCell 520 being configured with an activated PUCCH for a DU 510, multiple cells, including a PSCell 520, may have activated PUCCHs for the DU 510. In such aspects, each of the multiple cells may carry control information for a subset of a set of cells supported by a DU 510. Thus, the UE 115-*b* may transmit control information for a first subset of cells to the PSCell 520 supported by a DU 510, and the UE 115-*b* may transmit control information for a second subset of cells to another cell supported by the DU 510 (i.e., the same DU). The first subset of cells may or may not overlap with the second subset of cells. That is, the PSCell 520 and the other cell may carry PUCCHs for non-overlapping sets of cells of a DU 510 or overlapping sets of cells of a DU 510. If multiple cells carry PUCCHs for overlapping sets of cells supported by a DU 510, the UE 115-*b* may have flexibility with transmitting control information to a base station 105 at the expense of additional resources and complexity of operation.

Figure 6:
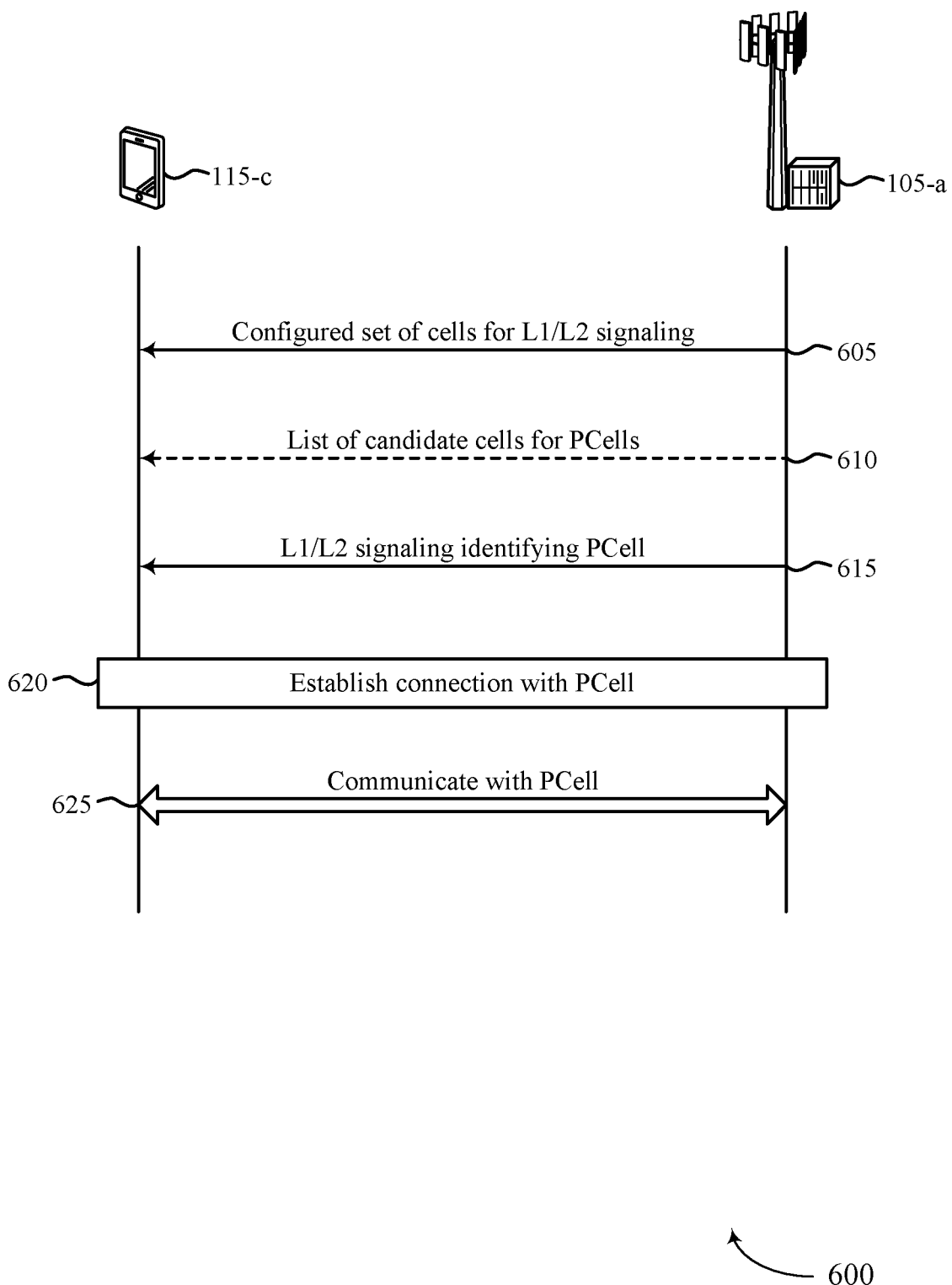
FIG. 6 illustrates an example of a process flow that supports PCell and PSCell management for cells within an activated cell set in accordance with aspects of the present disclosure.

FIG. 6 illustrates an example of a process flow 600 that supports PCell and PSCell management for cells within an activated cell set in accordance with aspects of the present disclosure. The process flow 600 illustrates aspects of techniques performed by a UE 115-*d*, which may be an example of a UE 115 described with reference to FIGS. 1-5. The process flow 600 also illustrates aspects of techniques performed by a base station 105-*a*, which may be an example of a base station 105 described with reference to FIGS. 1-5. The process flow may illustrate aspects of the wireless communications system 500. For example, the process flow 600 may support efficient techniques for facilitating L1/L2 mobility to limit the latency associated with PCell management and PSCell management.

In the following description of process flow 600, the operations may be performed (e.g., reported or provided) in a different order than the order shown, or the operations performed by the UE 115-*c* and the base station 105-*a* may be performed in different orders or at different times. For example, specific operations may also be left out of process flow 600, or other operations may be added to process flow 600. Further, although some operations or signaling may be shown to occur at different times for discussion purposes, these operations may actually occur at the same time. For instance, the indications at 605 and 610 may be included in the same signaling or message.

At 605, the base station 105-*a* may transmit, and the UE 115-*c* may receive, RRC signaling indicating a set of cells configured for L1/L2 mobility. The set of cells configured for L1/L2 mobility may include a first cell supported by a first DU and a second cell supported by a second DU, where the first DU and the second DU are supported by a same CU at the base station 105-*a*. At 610, the base station 105-*a* may transmit, and the UE 115-*c* may receive, in the RRC signaling, a list of candidate cells for a PCell from the set of cells configured for L1/L2 mobility. At 615, the base station 105-*a* may transmit, and the UE 115-*c* may receive, L1/L2 signaling identifying the PCell from the list of candidate cells. In some cases, in addition to receiving signaling identifying the PCell, the UE 115-*c* may receive signaling identifying a primary DU that supports the PCell. For instance, the base station 105-*a* may transmit, and the UE 115-*c* may receive, an indication of the primary DU that supports the PCell in the RRC signaling at 605 and 610 or in the L1/L2 signaling at 615. At 620, the UE 115-*c* may then establish a connection with the PCell, and, at 625, the UE 115-*c* may communicate with the PCell based on receiving the L1/L2 signaling at 615.

In some cases, after connecting to the PCell and communicating with the PCell for some time, channel conditions may change, and it may be appropriate for the UE 115-*c* to change PCells. In such cases, the base station 105 may trigger a handover at the UE 115-*c* from the PCell to another PCell. The PCell to which the UE 115-*c* is connected may be referred to as a first PCell (e.g., source PCell), and the PCell to which the UE 115-*c* is to perform the handover may be referred to as a second PCell (e.g., target PCell). If the second PCell is a member of the set of cells configured for L1/L2 mobility, the base station 105-*a* may transmit, and the UE 115-*c* may receive, L1/L2 signaling triggering the handover to the second PCell. Alternatively, if the second PCell is a non-member of the set of cells configured for L1/L2 mobility, the base station 105-*a* may transmit, and the UE 115-*c* may receive, L3 signaling triggering the handover to the second PCell. In any case, the UE 115-*c* may then perform the handover to the second PCell based on receiving the L1/L2 signaling or L3 signaling triggering the handover.

Figure 7:
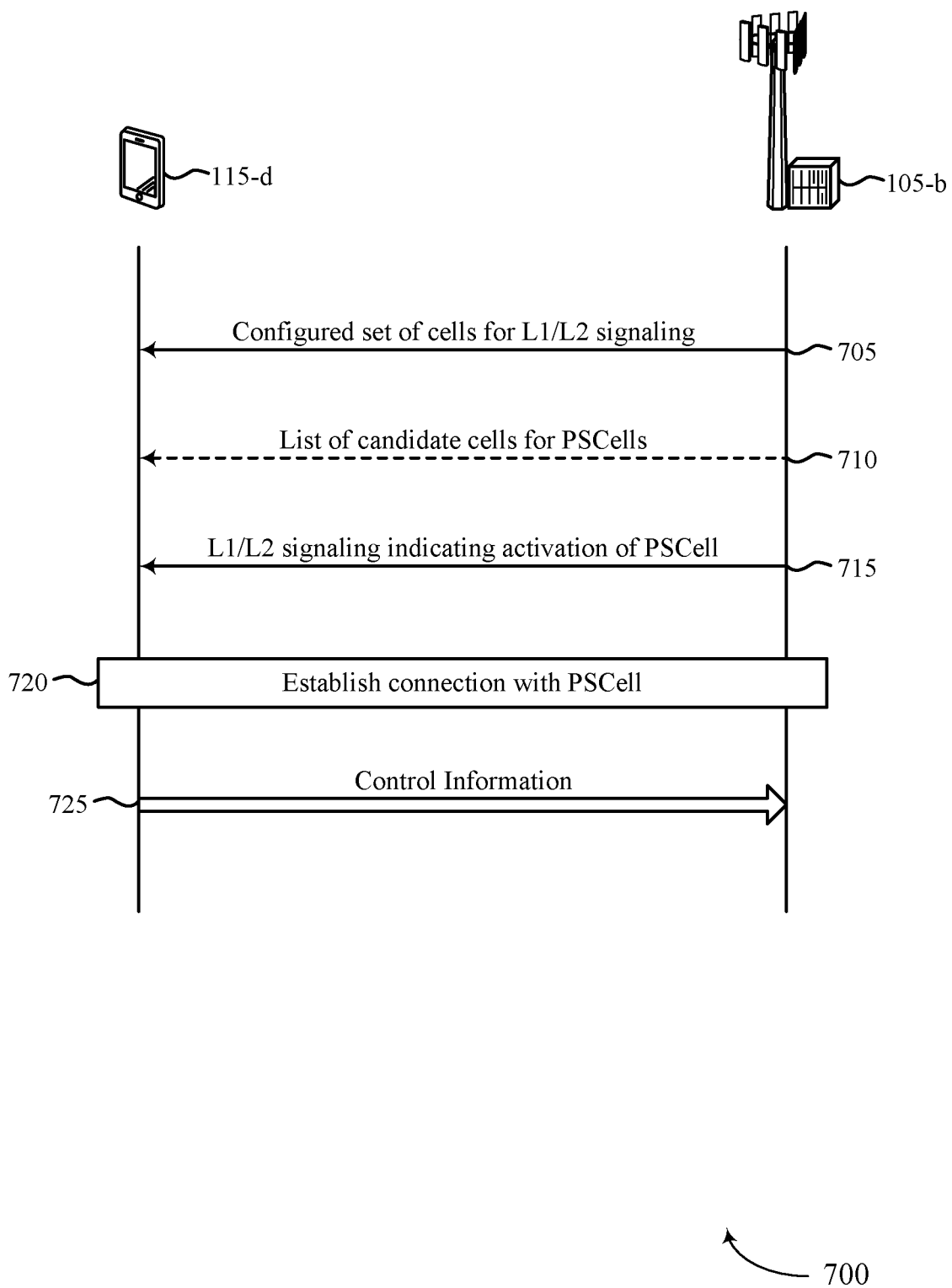
FIG. 7 illustrates an example of a process flow that supports PCell and PSCell management for cells within an activated cell set in accordance with aspects of the present disclosure.

FIG. 7 illustrates an example of a process flow 700 that supports PCell and PSCell management for cells within an activated cell set in accordance with aspects of the present disclosure. The process flow 700 illustrates aspects of techniques performed by a UE 115-*c*, which may be an example of a UE 115 described with reference to FIGS. 1-6. The process flow 700 also illustrates aspects of techniques performed by a base station 105-*c*, which may be an example of a base station 105 described with reference to FIGS. 1-6. The process flow may illustrate aspects of the wireless communications system 500. For example, the process flow 700 may support efficient techniques for facilitating L1/L2 mobility to limit the latency associated with PCell management and PSCell management.

In the following description of process flow 700, the operations may be performed (e.g., reported or provided) in a different order than the order shown, or the operations performed by the UE 115-*c* and the base station 105-*c* may be performed in different orders or at different times. For example, specific operations may also be left out of process flow 700, or other operations may be added to process flow 700. Further, although some operations or signaling may be shown to occur at different times for discussion purposes, these operations may actually occur at the same time. For instance, the indications at 705 and 710 may be included in the same signaling or message.

At 705, the base station 105-*b* may transmit, and the UE 115-*d* may receive, RRC signaling indicating a set of cells configured for L1/L2 mobility. The set of cells configured for L1/L2 mobility may include a first cell supported by a first DU and a second cell supported by a second DU, where the first DU and the second DU are supported by a same CU at the base station 105-*b*. At 710, the base station 105-*b* may transmit, and the UE 115-*d* may receive, in the RRC signaling, a list of candidate cells for a PSCell from the set of cells configured for L1/L2 mobility. At 715, the base station 105-*b* may transmit, and the UE 115-*d* may receive, L1/L2 signaling indicating activation of the PSCell from the list of candidate cells. In some cases, the L1/L2 signaling may identify (e.g., explicitly indicate) the PSCell. In other cases, the UE 115-*d* may identify the PSCell from the list of candidate cells based on one or more rules. In such cases, the base station 105-*b* may also identify the PSCell from the list of candidate cells based on one or more rules. The one or more rules may indicate that the PSCell corresponds to a cell in the list of candidate cells with a defined cell ID or a defined priority.

At 720, the UE 115-*c* may then establish a connection with the PSCell, and, at 725, the UE 115-*c* may transmit control information in a first control channel to the PSCell, where the control information in the first control channel is associated with a first subset of the set of cells configured for L1/L2 mobility that are linked to a same DU as the PSCell. That is, a first control channel configured on the PSCell may carry control information for cells linked to a same DU as the PSCell. In some cases, the UE 115-*d* may also transmit control information in a second control channel to another cell in the set of cells configured for L1/L2 mobility, where the control information in the second control channel is associated with a second subset of the set of cells configured for L1/L2 mobility that are linked to a same DU as the PSCell. That is, control channels configured on multiple cells including the PSCell may carry control information for cells linked to a same DU as the PSCell. The first subset of cells for which control information is transmitted to the PSCell and the second subset of cells for which control information is transmitted to the other cell may be overlapping or non-overlapping.

Figure 8:
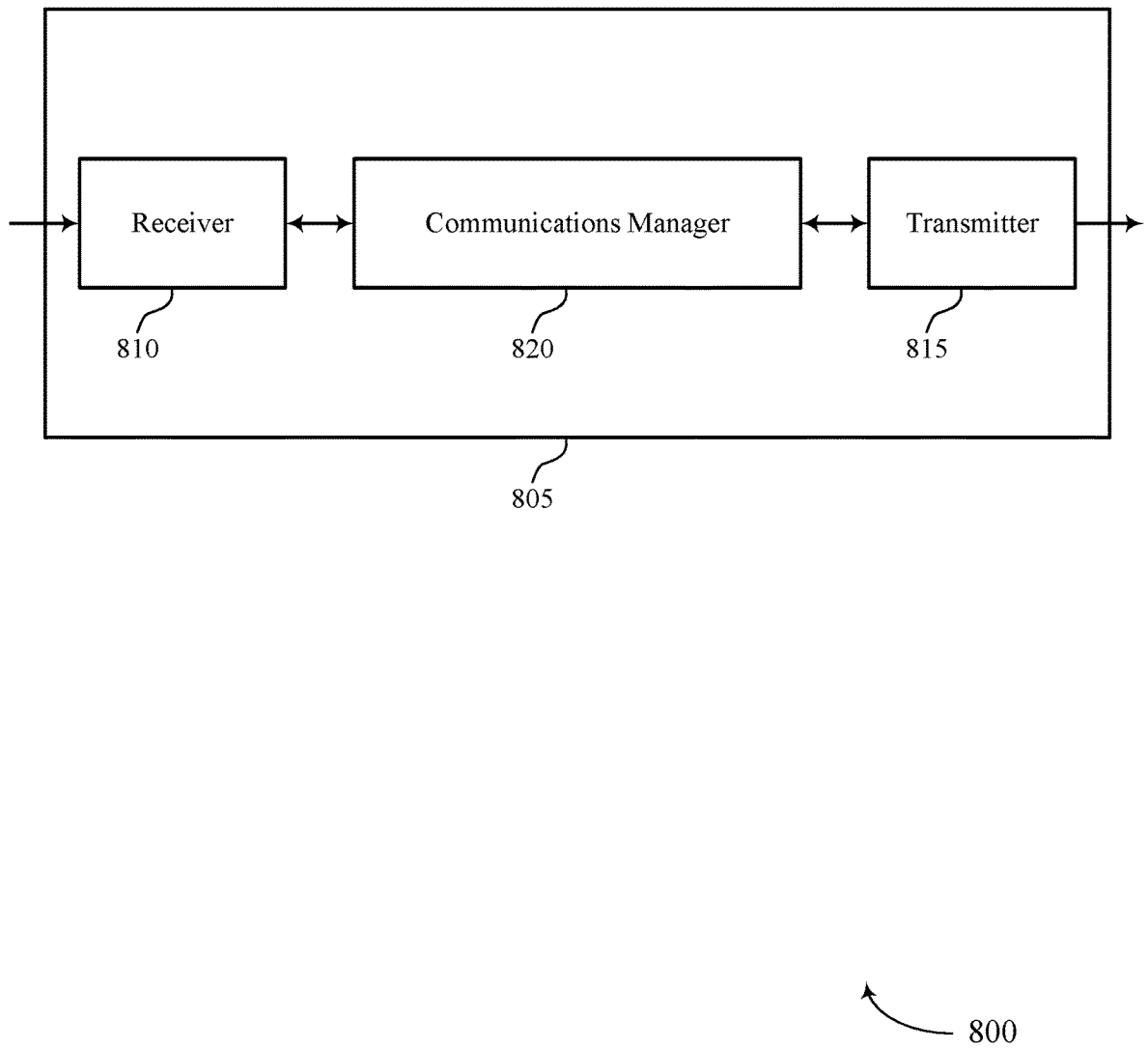
FIGS. 8 and 9 show block diagrams of devices that support PCell and PSCell management for cells within an activated cell set in accordance with aspects of the present disclosure.

FIG. 8 shows a block diagram 800 of a device 805 that supports PCell and PSCell management for cells within an activated cell set in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to PCell and PSCell management for cells within an activated cell set). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to PCell and PSCell management for cells within an activated cell set). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of PCell and PSCell management for cells within an activated cell set as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. For example, the communications manager 820 may be configured as or otherwise support a means for receiving radio resource control signaling from a base station indicating a set of cells configured for layer one or layer two mobility and indicating a list of candidate cells for a primary cell from the set of cells. The communications manager 820 may be configured as or otherwise support a means for receiving layer one or layer two signaling from the base station identifying the primary cell from the list of candidate cells. The communications manager 820 may be configured as or otherwise support a means for communicating with the primary cell based on receiving the layer one or layer two signaling.

Additionally, or alternatively, the communications manager 820 may support wireless communication at a UE in accordance with examples as disclosed herein. For example, the communications manager 820 may be configured as or otherwise support a means for receiving radio resource control signaling from a base station indicating a set of cells configured for layer one or layer two mobility and indicating a list of candidate cells for a primary secondary cell from the set of cells. The communications manager 820 may be configured as or otherwise support a means for receiving layer one or layer two signaling indicating activation of the primary secondary cell from the list of candidate cells. The communications manager 820 may be configured as or otherwise support a means for transmitting control information in a first control channel to the primary secondary cell, where the control information in the first control channel is associated with a first subset of the set of cells linked to a same distributed unit as the primary secondary cell.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reducing processing and power consumption. In particular, because the communications manager 820 may use L1/L2 signaling for PCell and PSCell management, the latency associated with connecting to a PCell or PSCell may be lowered. As a result, the processing time and power consumption for connecting to the PCell or PSCell may also be lowered. That is, the utilization of L1/L2-based mobility offers lower latency in transitioning to an appropriate or better cell. The L1/L2-based mobility may be enabled by L1/L2 signaling and may result in overall better performance and smaller cell loss (e.g., which may be especially important for high-frequency (FR2) operation and may also be applicable to low-frequency (FR1) operation).

Figure 9:
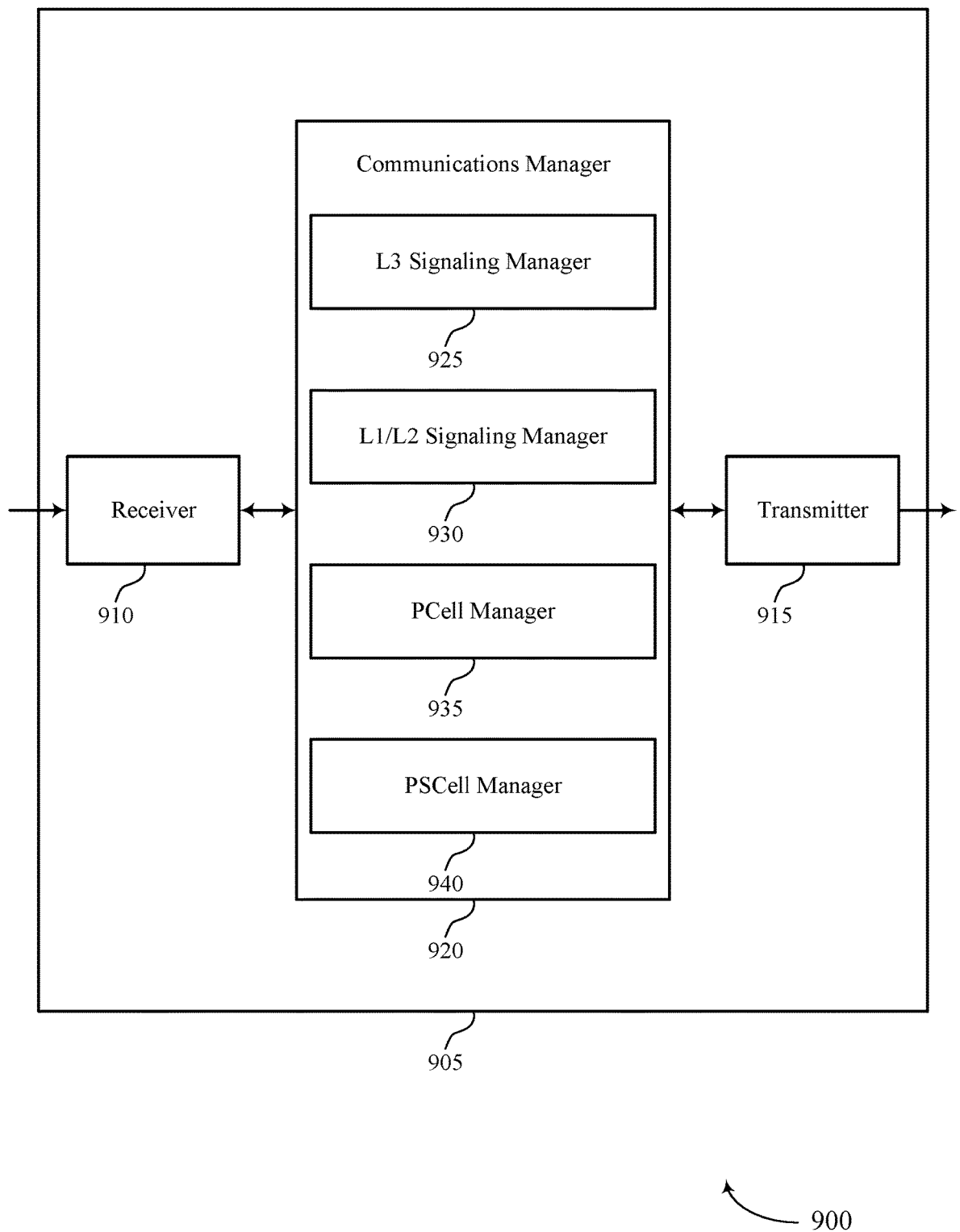

FIG. 9 shows a block diagram 900 of a device 905 that supports PCell and PSCell management for cells within an activated cell set in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to PCell and PSCell management for cells within an activated cell set). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to PCell and PSCell management for cells within an activated cell set). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of PCell and PSCell management for cells within an activated cell set as described herein. For example, the communications manager 920 may include a L3 signaling manager 925, a L1/L2 signaling manager 930, a PCell manager 935, a PSCell manager 940, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. The L3 signaling manager 925 may be configured as or otherwise support a means for receiving radio resource control signaling from a base station indicating a set of cells configured for layer one or layer two mobility and indicating a list of candidate cells for a primary cell from the set of cells. The L1/L2 signaling manager 930 may be configured as or otherwise support a means for receiving layer one or layer two signaling from the base station identifying the primary cell from the list of candidate cells. The PCell manager 935 may be configured as or otherwise support a means for communicating with the primary cell based on receiving the layer one or layer two signaling.

Additionally, or alternatively, the communications manager 920 may support wireless communication at a UE in accordance with examples as disclosed herein. The L3 signaling manager 925 may be configured as or otherwise support a means for receiving radio resource control signaling from a base station indicating a set of cells configured for layer one or layer two mobility and indicating a list of candidate cells for a primary secondary cell from the set of cells. The L1/L2 signaling manager 930 may be configured as or otherwise support a means for receiving layer one or layer two signaling indicating activation of the primary secondary cell from the list of candidate cells. The PSCell manager 940 may be configured as or otherwise support a means for transmitting control information in a first control channel to the primary secondary cell, where the control information in the first control channel is associated with a first subset of the set of cells linked to a same distributed unit as the primary secondary cell.

Figure 10:
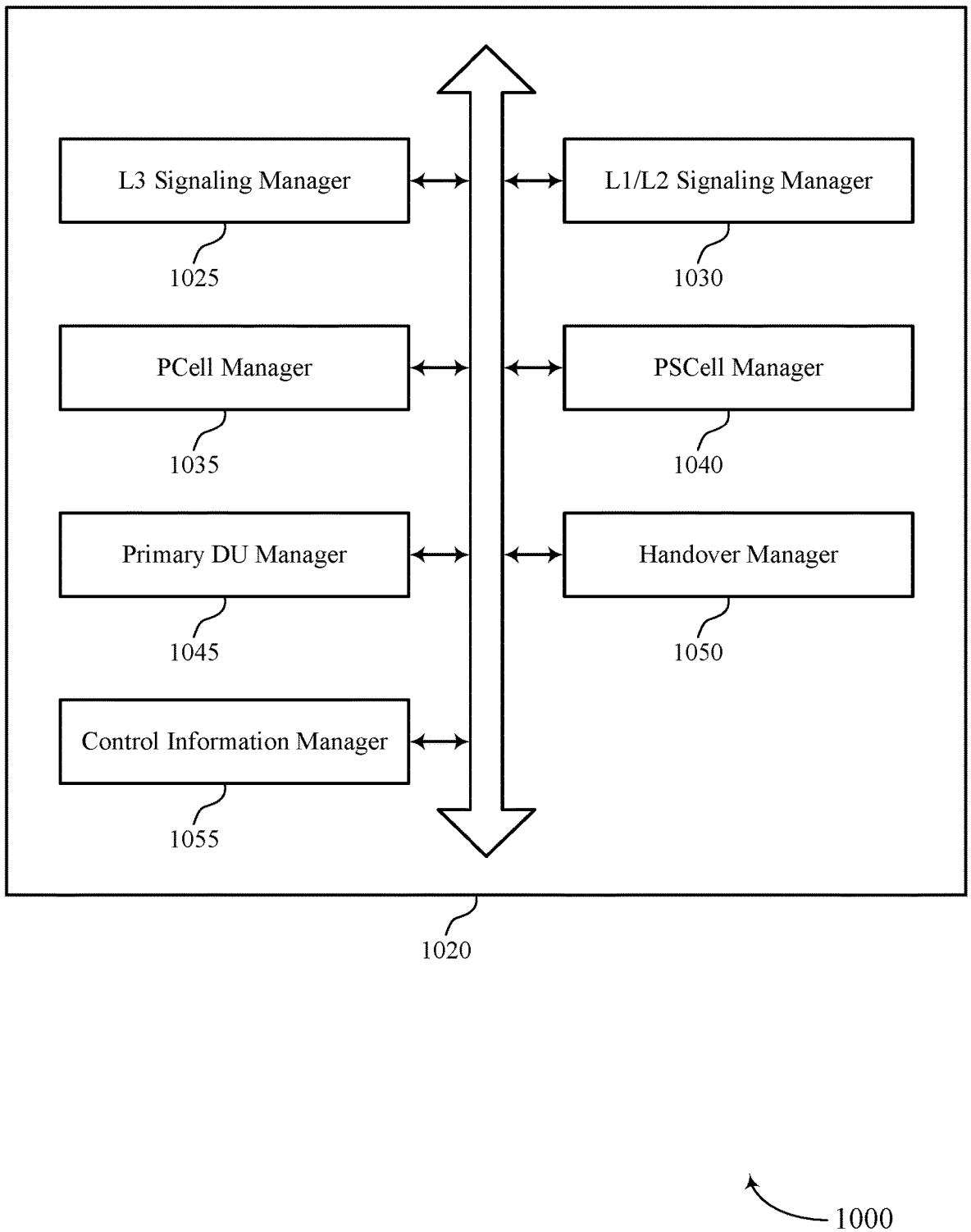
FIG. 10 shows a block diagram of a communications manager that supports PCell and PSCell management for cells within an activated cell set in accordance with aspects of the present disclosure.

FIG. 10 shows a block diagram 1000 of a communications manager 1020 that supports PCell and PSCell management for cells within an activated cell set in accordance with aspects of the present disclosure. The communications manager 1020 may be an example of aspects of a communications manager 820, a communications manager 920, or both, as described herein. The communications manager 1020, or various components thereof, may be an example of means for performing various aspects of PCell and PSCell management for cells within an activated cell set as described herein. For example, the communications manager 1020 may include a L3 signaling manager 1025, a L1/L2 signaling manager 1030, a PCell manager 1035, a PSCell manager 1040, a primary DU manager 1045, a handover manager 1050, a control information manager 1055, or any combination thereof. Each of these components may communicate, directly or indirectly, with one another (e.g., via one or more buses).

The communications manager 1020 may support wireless communication at a UE in accordance with examples as disclosed herein. The L3 signaling manager 1025 may be configured as or otherwise support a means for receiving radio resource control signaling from a base station indicating a set of cells configured for layer one or layer two mobility and indicating a list of candidate cells for a primary cell from the set of cells. The L1/L2 signaling manager 1030 may be configured as or otherwise support a means for receiving layer one or layer two signaling from the base station identifying the primary cell from the list of candidate cells. The PCell manager 1035 may be configured as or otherwise support a means for communicating with the primary cell based on receiving the layer one or layer two signaling.

In some examples, the primary DU manager 1045 may be configured as or otherwise support a means for receiving, in the radio resource control signaling, an indication of a primary distributed unit that supports the primary cell. In some examples, the L1/L2 signaling manager 1030 may be configured as or otherwise support a means for receiving, from the primary distributed unit, the layer one or layer two signaling identifying the primary cell from the list of candidate cells.

In some examples, the primary DU manager 1045 may be configured as or otherwise support a means for receiving, in the layer one or layer two signaling, an indication of a primary distributed unit that supports the primary cell. In some examples, the L1/L2 signaling manager 1030 may be configured as or otherwise support a means for receiving, from the primary distributed unit, the layer one or layer two signaling identifying the primary cell from the list of candidate cells.

In some examples, the primary cell includes a first primary cell, and the L1/L2 signaling manager 1030 may be configured as or otherwise support a means for receiving second layer one or layer two signaling triggering a handover to a second primary cell that is a member of the set of cells configured for layer one or layer two mobility. In some examples, the primary cell includes a first primary cell, and the handover manager 1050 may be configured as or otherwise support a means for performing the handover to the second primary cell based on receiving the second layer one or layer two signaling.

In some examples, the primary cell includes a first primary cell, and the L3 signaling manager 1025 may be configured as or otherwise support a means for receiving layer three signaling triggering a handover to a second primary cell that is a non-member of the set of cells configured for layer one or layer two mobility. In some examples, the primary cell includes a first primary cell, and the handover manager 1050 may be configured as or otherwise support a means for performing the handover to the second primary cell based on receiving the layer three signaling. In some examples, the radio resource control signaling includes first radio resource control signaling, and the L3 signaling manager 1025 may be configured as or otherwise support a means for receiving second radio resource control signaling indicating an updated set of cells configured for layer one or layer two mobility based on performing the handover.

In some examples, a first cell in the set of cells configured for layer one or layer two mobility is supported by a first distributed unit at the base station. In some examples, a second cell in the set of cells configured for layer one or layer two mobility is supported by a second distributed unit at the base station. In some examples, the first distributed unit and the second distributed unit are supported by a same central unit at the base station.

Additionally, or alternatively, the communications manager 1020 may support wireless communication at a UE in accordance with examples as disclosed herein. In some examples, the L3 signaling manager 1025 may be configured as or otherwise support a means for receiving radio resource control signaling from a base station indicating a set of cells configured for layer one or layer two mobility and indicating a list of candidate cells for a primary secondary cell from the set of cells. In some examples, the L1/L2 signaling manager 1030 may be configured as or otherwise support a means for receiving layer one or layer two signaling indicating activation of the primary secondary cell from the list of candidate cells. The PSCell manager 1040 may be configured as or otherwise support a means for transmitting control information in a first control channel to the primary secondary cell, where the control information in the first control channel is associated with a first subset of the set of cells linked to a same distributed unit as the primary secondary cell.

In some examples, to support receiving the layer one or layer two signaling indicating activation of the primary secondary cell, the L1/L2 signaling manager 1030 may be configured as or otherwise support a means for receiving layer one or layer two signaling identifying the primary secondary cell from the list of candidate cells. In some examples, the PSCell manager 1040 may be configured as or otherwise support a means for identifying the primary secondary cell from the list of candidate cells based on one or more rules. In some examples, the one or more rules indicate that the primary secondary cell corresponds to a cell in the list of candidate cells with a defined cell identifier or a defined priority.

In some examples, the control information manager 1055 may be configured as or otherwise support a means for transmitting control information in a second control channel to another cell in the set of cells, where the control information in the second control channel is associated with a second subset of the set of cells linked to the same distributed unit as the primary secondary cell. In some examples, the first subset of the set of cells for which control information is transmitted in the first control channel overlaps with the second subset of the set of cells for which control information is transmitted in the second control channel. In some examples, the first subset of the set of cells for which control information is transmitted in the first control channel is non-overlapping with the second subset of the set of cells for which control information is transmitted in the second control channel.

Figure 11:
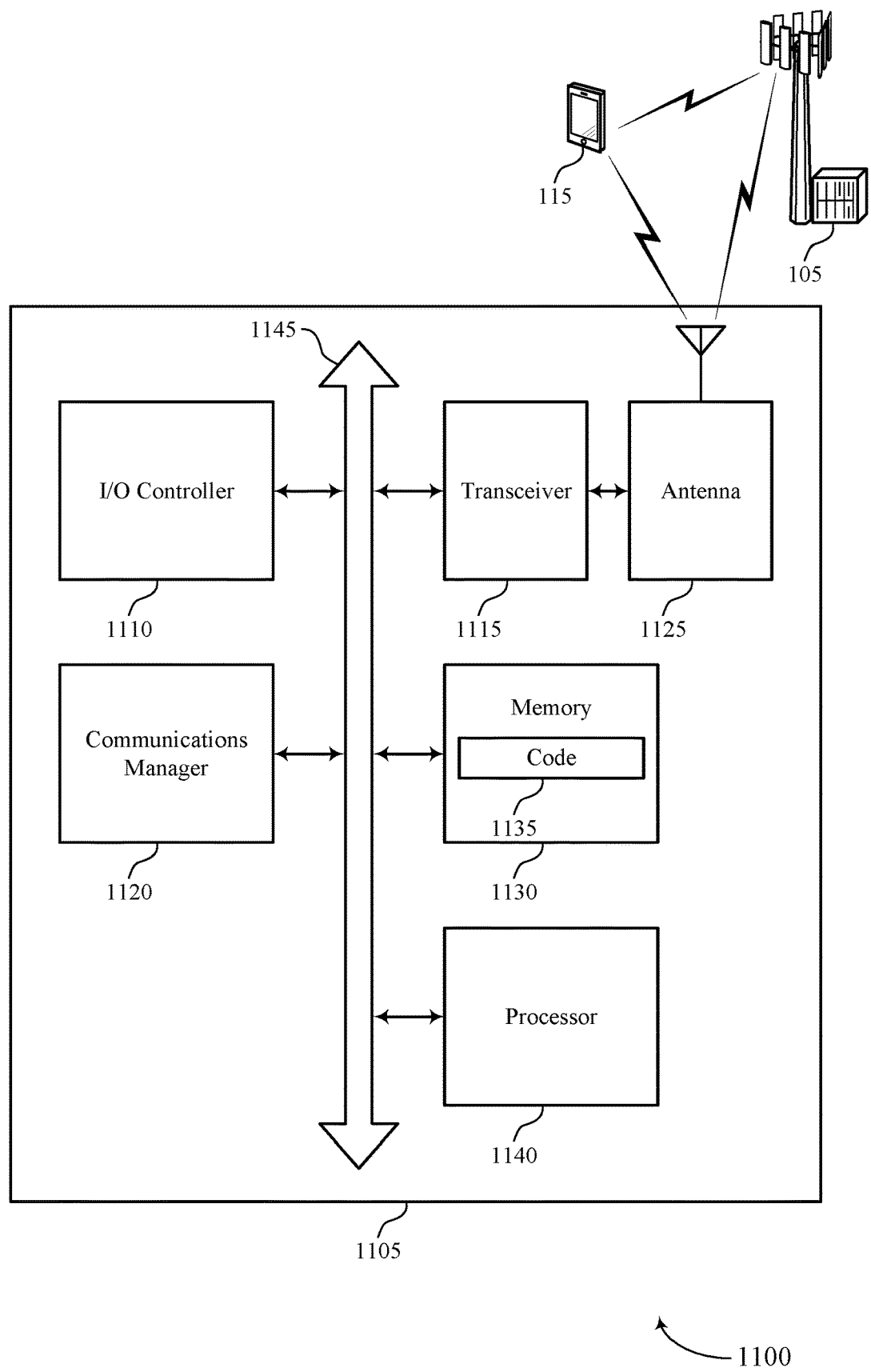
FIG. 11 shows a diagram of a system including a device that supports PCell and PSCell management for cells within an activated cell set in accordance with aspects of the present disclosure.

FIG. 11 shows a diagram of a system 1100 including a device 1105 that supports PCell and PSCell management for cells within an activated cell set in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting PCell and PSCell management for cells within an activated cell set). For example, the device 1105 or a component of the device 1105 may include a processor 1140 and memory 1130 coupled to the processor 1140, the processor 1140 and memory 1130 configured to perform various functions described herein.

The communications manager 1120 may support wireless communication at a UE in accordance with examples as disclosed herein. For example, the communications manager 1120 may be configured as or otherwise support a means for receiving radio resource control signaling from a base station indicating a set of cells configured for layer one or layer two mobility and indicating a list of candidate cells for a primary cell from the set of cells. The communications manager 1120 may be configured as or otherwise support a means for receiving layer one or layer two signaling from the base station identifying the primary cell from the list of candidate cells. The communications manager 1120 may be configured as or otherwise support a means for communicating with the primary cell based on receiving the layer one or layer two signaling.

Additionally, or alternatively, the communications manager 1120 may support wireless communication at a UE in accordance with examples as disclosed herein. For example, the communications manager 1120 may be configured as or otherwise support a means for receiving radio resource control signaling from a base station indicating a set of cells configured for layer one or layer two mobility and indicating a list of candidate cells for a primary secondary cell from the set of cells. The communications manager 1120 may be configured as or otherwise support a means for receiving layer one or layer two signaling indicating activation of the primary secondary cell from the list of candidate cells. The communications manager 1120 may be configured as or otherwise support a means for transmitting control information in a first control channel to the primary secondary cell, where the control information in the first control channel is associated with a first subset of the set of cells linked to a same distributed unit as the primary secondary cell.

By including or configuring the communications manager 1120 in accordance with examples as described herein, the device 1105 may support techniques for reducing processing and power consumption. In particular, because the communications manager 820 may use L1/L2 signaling for PCell and PSCell management, the latency associated with connecting to a PCell or PSCell may be lowered. As a result, the processing time and power consumption for connecting to the PCell or PSCell may also be lowered. That is, the utilization of L1/L2-based mobility offers lower latency in transitioning to an appropriate or better cell. The L1/L2-based mobility may be enabled by L1/L2 signaling and may result in overall better performance and smaller cell loss (e.g., which may be especially important for high-frequency (FR2) operation and may also be applicable to low-frequency (FR1) operation).

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of PCell and PSCell management for cells within an activated cell set as described herein, or the processor 1140 and the memory 1130 may be otherwise configured to perform or support such operations.

Figure 12:
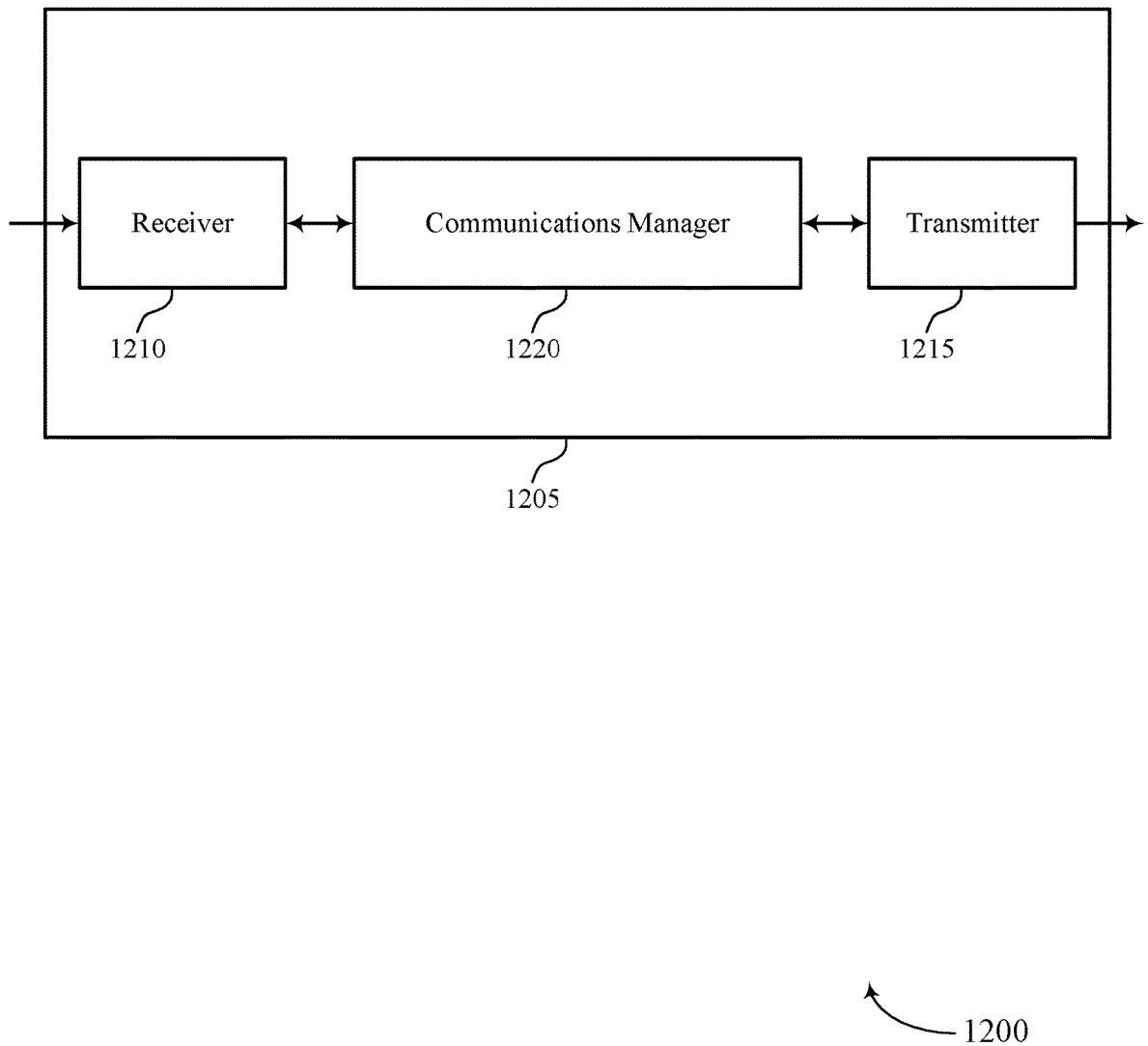
FIGS. 12 and 13 show block diagrams of devices that support PCell and PSCell management for cells within an activated cell set in accordance with aspects of the present disclosure.

FIG. 12 shows a block diagram 1200 of a device 1205 that supports PCell and PSCell management for cells within an activated cell set in accordance with aspects of the present disclosure. The device 1205 may be an example of aspects of a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to PCell and PSCell management for cells within an activated cell set). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to PCell and PSCell management for cells within an activated cell set). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of primary cell and primary secondary cell management for cells supported by different distributed units and a same control unit as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. For example, the communications manager 1220 may be configured as or otherwise support a means for transmitting radio resource control signaling to a UE indicating a set of cells configured for layer one or layer two mobility and indicating a list of candidate cells for a primary cell from the set of cells. The communications manager 1220 may be configured as or otherwise support a means for transmitting layer one or layer two signaling to the UE identifying the primary cell from the list of candidate cells. The communications manager 1220 may be configured as or otherwise support a means for communicating with the UE via the primary cell based on transmitting the layer one or layer two signaling.

Additionally, or alternatively, the communications manager 1220 may support wireless communication at a base station in accordance with examples as disclosed herein. For example, the communications manager 1220 may be configured as or otherwise support a means for transmitting radio resource control signaling to a UE indicating a set of cells configured for layer one or layer two mobility and indicating a list of candidate cells for a primary secondary cell from the set of cells. The communications manager 1220 may be configured as or otherwise support a means for transmitting layer one or layer two signaling indicating activation of the primary secondary cell from the list of candidate cells. The communications manager 1220 may be configured as or otherwise support a means for receiving control information in a first control channel via the primary secondary cell, where the control information in the first control channel is associated with a first subset of the set of cells linked to a same distributed unit as the primary secondary cell.

By including or configuring the communications manager 1220 in accordance with examples as described herein, the device 1205 (e.g., a processor controlling or otherwise coupled to the receiver 1210, the transmitter 1215, the communications manager 1220, or a combination thereof) may support techniques for reducing processing and power consumption. In particular, because the communications manager 820 may use L1/L2 signaling for PCell and PSCell management, the latency associated with connecting to a PCell or PSCell may be lowered. As a result, the processing time and power consumption for connecting to the PCell or PSCell may also be lowered. That is, the utilization of L1/L2-based mobility offers lower latency in transitioning to an appropriate or better cell. The L1/L2-based mobility may be enabled by L1/L2 signaling and may result in overall better performance and smaller cell loss (e.g., which may be especially important for high-frequency (FR2) operation and may also be applicable to low-frequency (FR1) operation).

Figure 13:
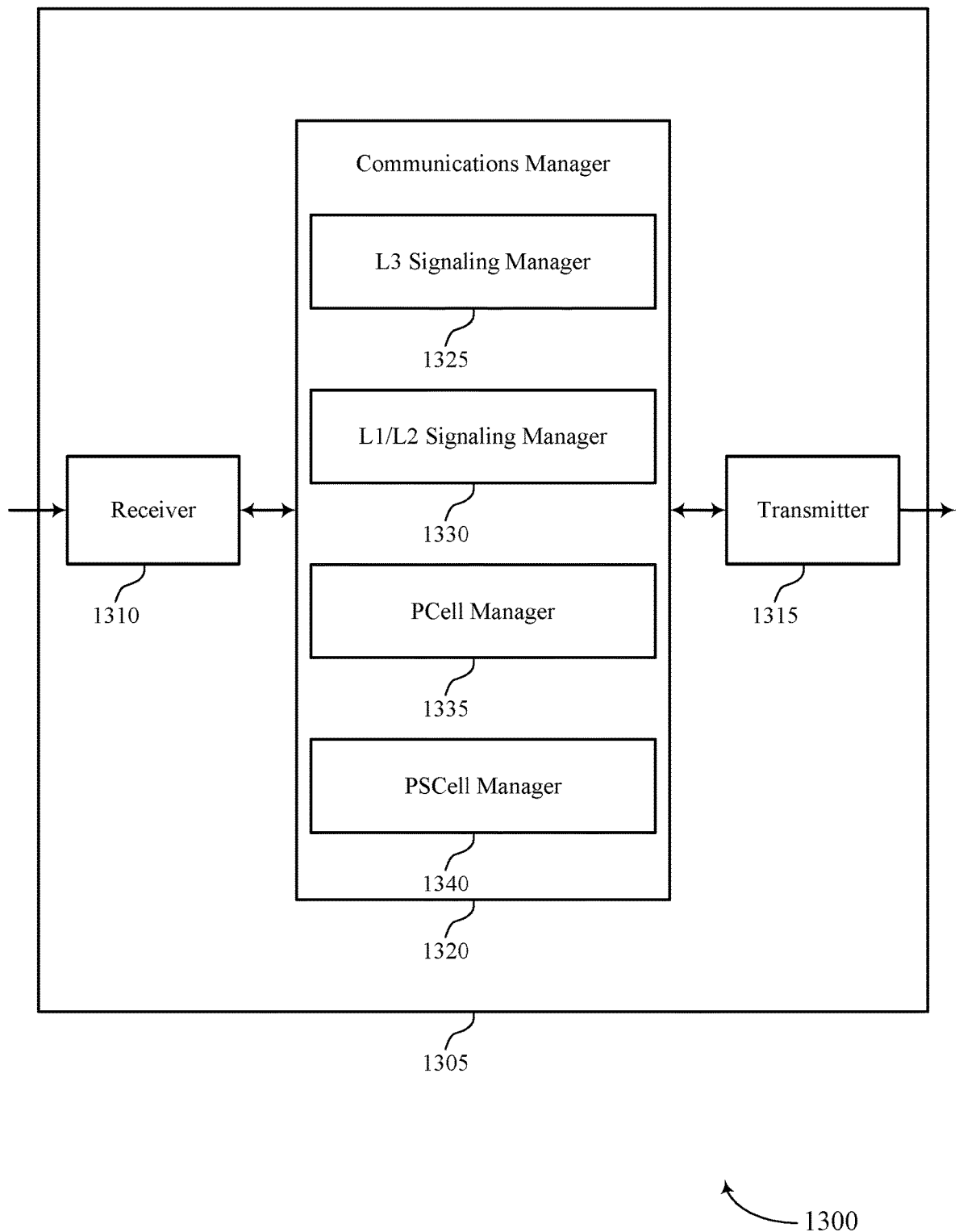

FIG. 13 shows a block diagram 1300 of a device 1305 that supports PCell and PSCell management for cells within an activated cell set in accordance with aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to PCell and PSCell management for cells within an activated cell set). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to PCell and PSCell management for cells within an activated cell set). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of PCell and PSCell management for cells within an activated cell set as described herein. For example, the communications manager 1320 may include a L3 signaling manager 1325, a L1/L2 signaling manager 1330, a PCell manager 1335, a PSCell manager 1340, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a base station in accordance with examples as disclosed herein. The L3 signaling manager 1325 may be configured as or otherwise support a means for transmitting radio resource control signaling to a UE indicating a set of cells configured for layer one or layer two mobility and indicating a list of candidate cells for a primary cell from the set of cells. The L1/L2 signaling manager 1330 may be configured as or otherwise support a means for transmitting layer one or layer two signaling to the UE identifying the primary cell from the list of candidate cells. The PCell manager 1335 may be configured as or otherwise support a means for communicating with the UE via the primary cell based on transmitting the layer one or layer two signaling.

Additionally, or alternatively, the communications manager 1320 may support wireless communication at a base station in accordance with examples as disclosed herein. The L3 signaling manager 1325 may be configured as or otherwise support a means for transmitting radio resource control signaling to a UE indicating a set of cells configured for layer one or layer two mobility and indicating a list of candidate cells for a primary secondary cell from the set of cells. The L1/L2 signaling manager 1330 may be configured as or otherwise support a means for transmitting layer one or layer two signaling indicating activation of the primary secondary cell from the list of candidate cells. The PSCell manager 1340 may be configured as or otherwise support a means for receiving control information in a first control channel via the primary secondary cell, where the control information in the first control channel is associated with a first subset of the set of cells linked to a same distributed unit as the primary secondary cell.

Figure 14:
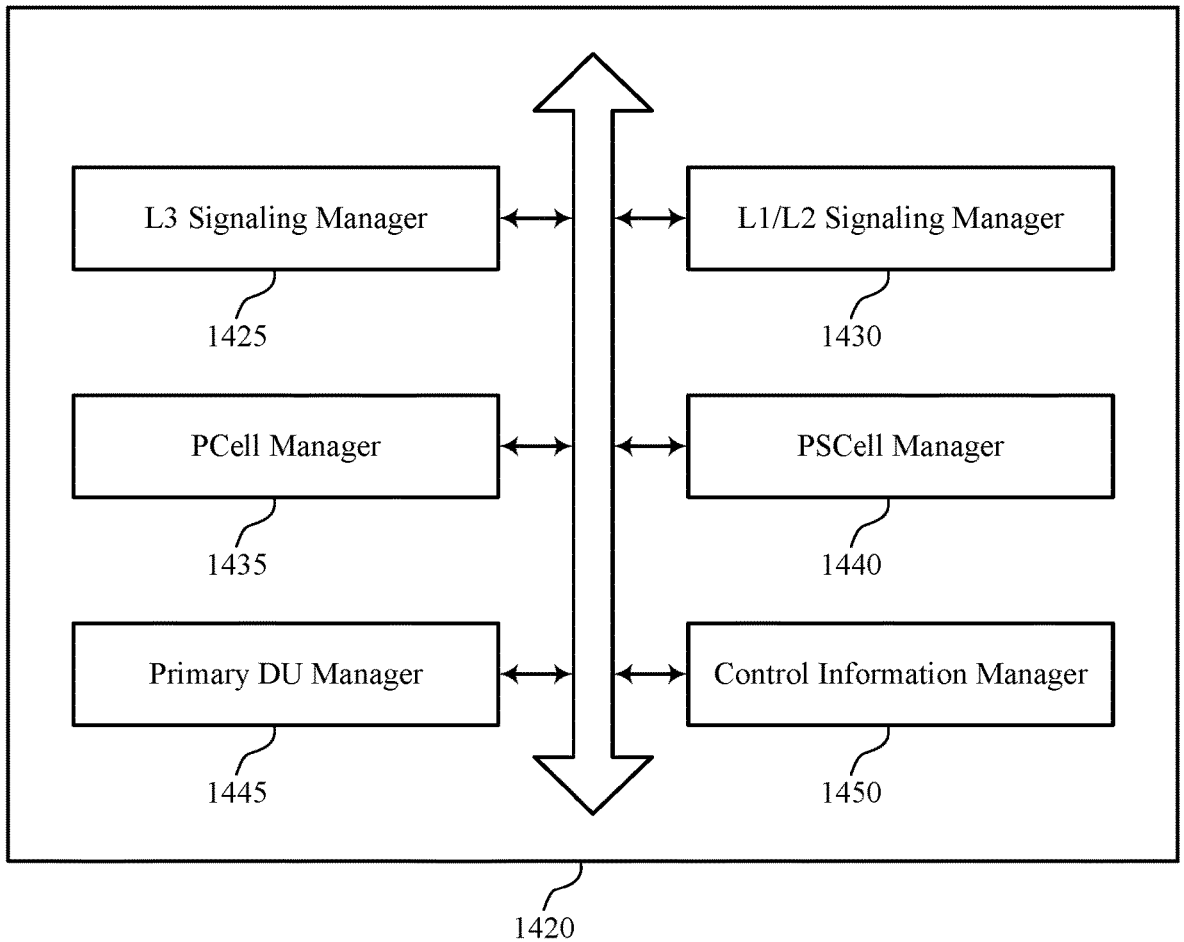
FIG. 14 shows a block diagram of a communications manager that supports PCell and PSCell management for cells within an activated cell set in accordance with aspects of the present disclosure.

FIG. 14 shows a block diagram 1400 of a communications manager 1420 that supports PCell and PSCell management for cells within an activated cell set in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of PCell and PSCell management for cells within an activated cell set as described herein. For example, the communications manager 1420 may include a L3 signaling manager 1425, a L1/L2 signaling manager 1430, a PCell manager 1435, a PSCell manager 1440, a primary DU manager 1445, a control information manager 1450, or any combination thereof. Each of these components may communicate, directly or indirectly, with one another (e.g., via one or more buses).

The communications manager 1420 may support wireless communication at a base station in accordance with examples as disclosed herein. The L3 signaling manager 1425 may be configured as or otherwise support a means for transmitting radio resource control signaling to a UE indicating a set of cells configured for layer one or layer two mobility and indicating a list of candidate cells for a primary cell from the set of cells. The L1/L2 signaling manager 1430 may be configured as or otherwise support a means for transmitting layer one or layer two signaling to the UE identifying the primary cell from the list of candidate cells. The PCell manager 1435 may be configured as or otherwise support a means for communicating with the UE via the primary cell based on transmitting the layer one or layer two signaling.

In some examples, the primary DU manager 1445 may be configured as or otherwise support a means for transmitting, in the radio resource control signaling, an indication of a primary distributed unit that supports the primary cell. In some examples, the L1/L2 signaling manager 1430 may be configured as or otherwise support a means for transmitting, via the primary distributed unit to the UE, the layer one or layer two signaling identifying the primary cell from the list of candidate cells.

In some examples, the primary DU manager 1445 may be configured as or otherwise support a means for exchanging signaling between a set of multiple distributed units at the base station. In some examples, the primary DU manager 1445 may be configured as or otherwise support a means for identifying a primary distributed unit for the UE based on the exchanging, where the primary distributed unit supports the primary cell. In some examples, the signaling exchanged between the set of multiple distributed units at the base station includes layer one measurements, a coverage area of each distributed unit, a predicted position of the UE, a load of each distributed unit, or a combination thereof.

In some examples, the primary DU manager 1445 may be configured as or otherwise support a means for transmitting, in the layer one or layer two signaling to the UE, an indication of the primary distributed unit that supports the primary cell. In some examples, the L1/L2 signaling manager 1430 may be configured as or otherwise support a means for transmitting, via the primary distributed unit to the UE, the layer one or layer two signaling identifying the primary cell from the list of candidate cells.

In some examples, the primary cell includes a first primary cell, the layer one or layer two signaling includes first layer one or layer two signaling, and the L1/L2 signaling manager 1430 may be configured as or otherwise support a means for transmitting second layer one or layer two signaling triggering a handover to a second primary cell that is a member of the set of cells configured for layer one or layer two mobility. In some examples, the primary cell includes a first primary cell, and the L3 signaling manager 1425 may be configured as or otherwise support a means for transmitting layer three signaling triggering a handover to a second primary cell that is a non-member of the set of cells configured for layer one or layer two mobility.

In some examples, the radio resource control signaling includes first radio resource control signaling, and the L3 signaling manager 1425 may be configured as or otherwise support a means for transmitting second radio resource control signaling indicating an updated set of cells configured for layer one or layer two mobility based on triggering the handover. In some examples, a first cell in the set of cells configured for layer one or layer two mobility is supported by a first distributed unit at the base station. In some examples, a second cell in the set of cells configured for layer one or layer two mobility is supported by a second distributed unit at the base station. In some examples, the first distributed unit and the second distributed unit are supported by a same central unit at the base station.

Additionally, or alternatively, the communications manager 1420 may support wireless communication at a base station in accordance with examples as disclosed herein. In some examples, the L3 signaling manager 1425 may be configured as or otherwise support a means for transmitting radio resource control signaling to a UE indicating a set of cells configured for layer one or layer two mobility and indicating a list of candidate cells for a primary secondary cell from the set of cells. In some examples, the L1/L2 signaling manager 1430 may be configured as or otherwise support a means for transmitting layer one or layer two signaling indicating activation of the primary secondary cell from the list of candidate cells. The PSCell manager 1440 may be configured as or otherwise support a means for receiving control information in a first control channel via the primary secondary cell, where the control information in the first control channel is associated with a first subset of the set of cells linked to a same distributed unit as the primary secondary cell.

In some examples, the L1/L2 signaling manager 1430 may be configured as or otherwise support a means for transmitting layer one or layer two signaling identifying the primary secondary cell from the list of candidate cells. In some examples, the PSCell manager 1440 may be configured as or otherwise support a means for identifying the primary secondary cell from the list of candidate cells based on one or more rules. In some examples, the one or more rules indicate that the primary secondary cell corresponds to a cell in the list of candidate cells with a defined cell identifier or a defined priority.

In some examples, the control information manager 1450 may be configured as or otherwise support a means for receiving control information in a second control channel via another cell in the set of cells, where the control information in the second control channel is associated with a second subset of the set of cells linked to the same distributed unit as the primary secondary cell. In some examples, the first subset of the set of cells for which control information is transmitted in the first control channel overlaps with the second subset of the set of cells for which control information is transmitted in the second control channel. In some examples, the first subset of the set of cells for which control information is transmitted in the first control channel is non-overlapping with the second subset of the set of cells for which control information is transmitted in the second control channel.

Figure 15:
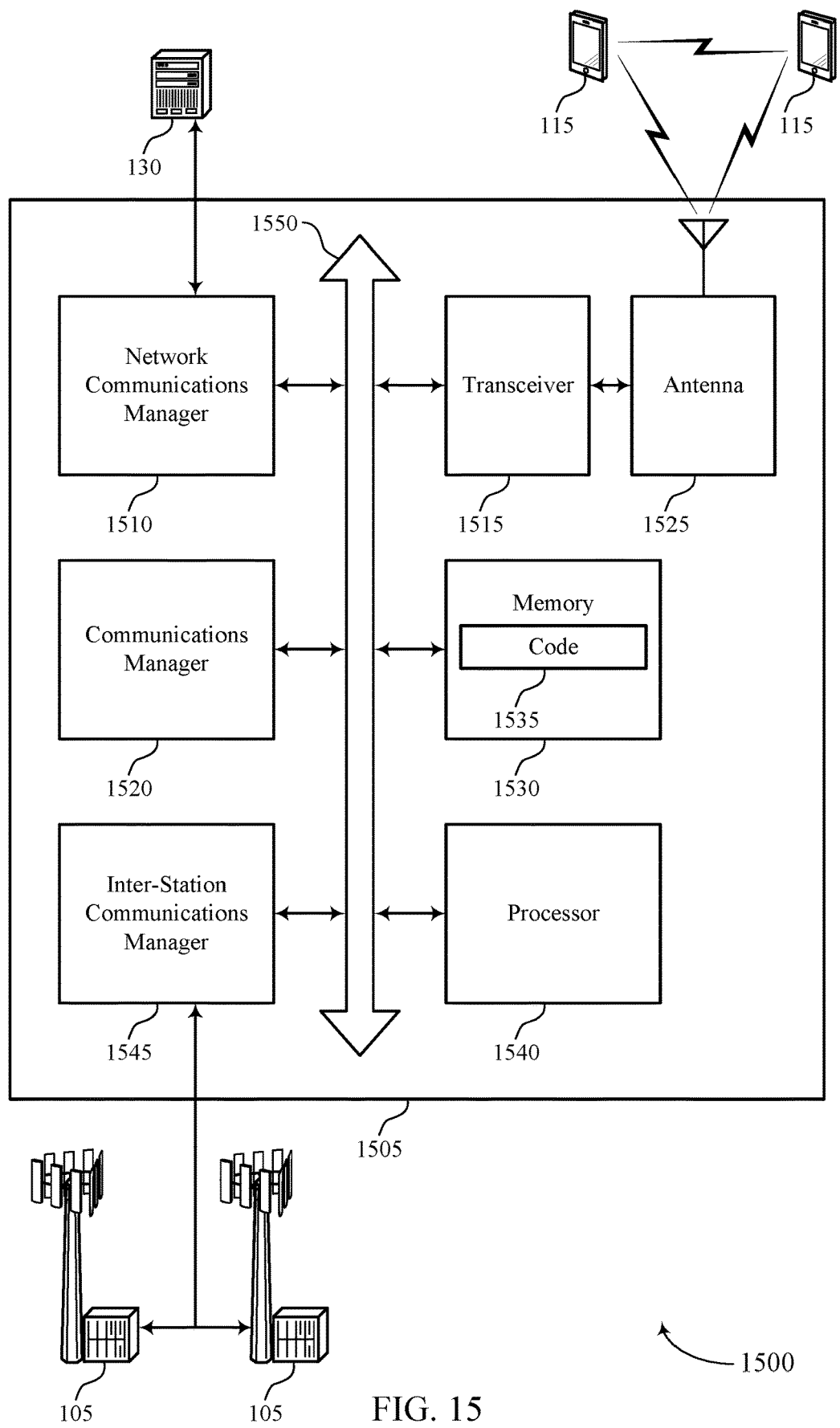
FIG. 15 shows a diagram of a system including a device that supports PCell and PSCell management for cells within an activated cell set in accordance with aspects of the present disclosure.

FIG. 15 shows a diagram of a system 1500 including a device 1505 that supports PCell and PSCell management for cells within an activated cell set in accordance with aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting PCell and PSCell management for cells within an activated cell set). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communication at a base station in accordance with examples as disclosed herein. For example, the communications manager 1520 may be configured as or otherwise support a means for transmitting radio resource control signaling to a UE indicating a set of cells configured for layer one or layer two mobility and indicating a list of candidate cells for a primary cell from the set of cells. The communications manager 1520 may be configured as or otherwise support a means for transmitting layer one or layer two signaling to the UE identifying the primary cell from the list of candidate cells. The communications manager 1520 may be configured as or otherwise support a means for communicating with the UE via the primary cell based on transmitting the layer one or layer two signaling.

Additionally, or alternatively, the communications manager 1520 may support wireless communication at a base station in accordance with examples as disclosed herein. For example, the communications manager 1520 may be configured as or otherwise support a means for transmitting radio resource control signaling to a UE indicating a set of cells configured for layer one or layer two mobility and indicating a list of candidate cells for a primary secondary cell from the set of cells. The communications manager 1520 may be configured as or otherwise support a means for transmitting layer one or layer two signaling indicating activation of the primary secondary cell from the list of candidate cells. The communications manager 1520 may be configured as or otherwise support a means for receiving control information in a first control channel via the primary secondary cell, where the control information in the first control channel is associated with a first subset of the set of cells linked to a same distributed unit as the primary secondary cell.

By including or configuring the communications manager 1520 in accordance with examples as described herein, the device 1505 may support techniques for reducing processing and power consumption. In particular, because the communications manager 820 may use L1/L2 signaling for PCell and PSCell management, the latency associated with connecting to a PCell or PSCell may be lowered. As a result, the processing time and power consumption for connecting to the PCell or PSCell may also be lowered. That is, the utilization of L1/L2-based mobility offers lower latency in transitioning to an appropriate or better cell. The L1/L2-based mobility may be enabled by L1/L2 signaling and may result in overall better performance and smaller cell loss (e.g., which may be especially important for high-frequency (FR2) operation and may also be applicable to low-frequency (FR1) operation).

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of PCell and PSCell management for cells within an activated cell set as described herein, or the processor 1540 and the memory 1530 may be otherwise configured to perform or support such operations.

Figure 16:
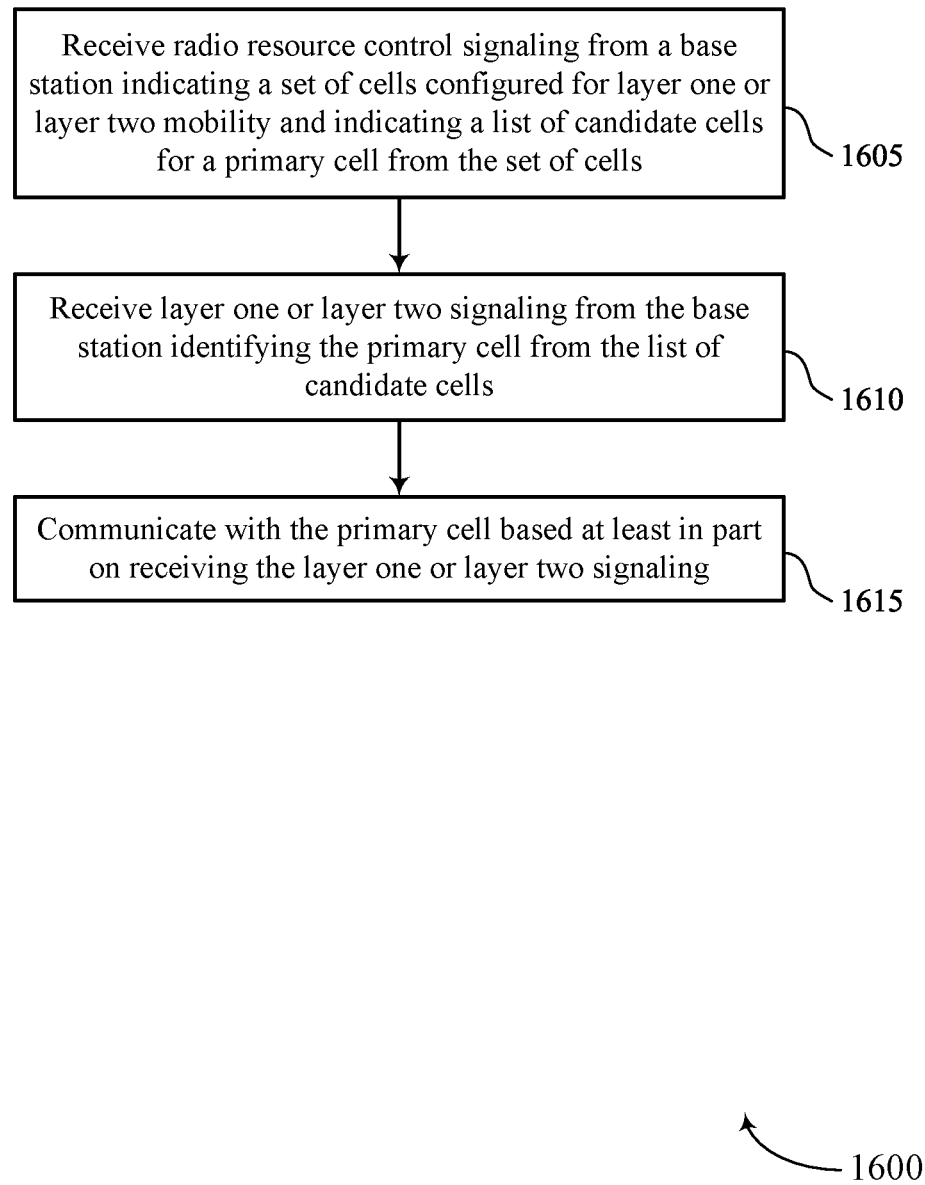
FIGS. 16 through 19 show flowcharts illustrating methods that support PCell and PSCell management for cells within an activated cell set in accordance with aspects of the present disclosure.

FIG. 16 shows a flowchart illustrating a method 1600 that supports PCell and PSCell management for cells within an activated cell set in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving radio resource control signaling from a base station indicating a set of cells configured for layer one or layer two mobility and indicating a list of candidate cells for a primary cell from the set of cells. The operations of 1605 may be performed in accordance with examples as disclosed herein. In some examples, aspects of the operations of 1605 may be performed by a L3 signaling manager 1025 as described with reference to FIG. 10.

At 1610, the method may include receiving layer one or layer two signaling from the base station identifying the primary cell from the list of candidate cells. The operations of 1610 may be performed in accordance with examples as disclosed herein. In some examples, aspects of the operations of 1610 may be performed by a L1/L2 signaling manager 1030 as described with reference to FIG. 10.

At 1615, the method may include communicating with the primary cell based on receiving the layer one or layer two signaling. The operations of 1615 may be performed in accordance with examples as disclosed herein. In some examples, aspects of the operations of 1615 may be performed by a PCell manager 1035 as described with reference to FIG. 10.

Figure 17:
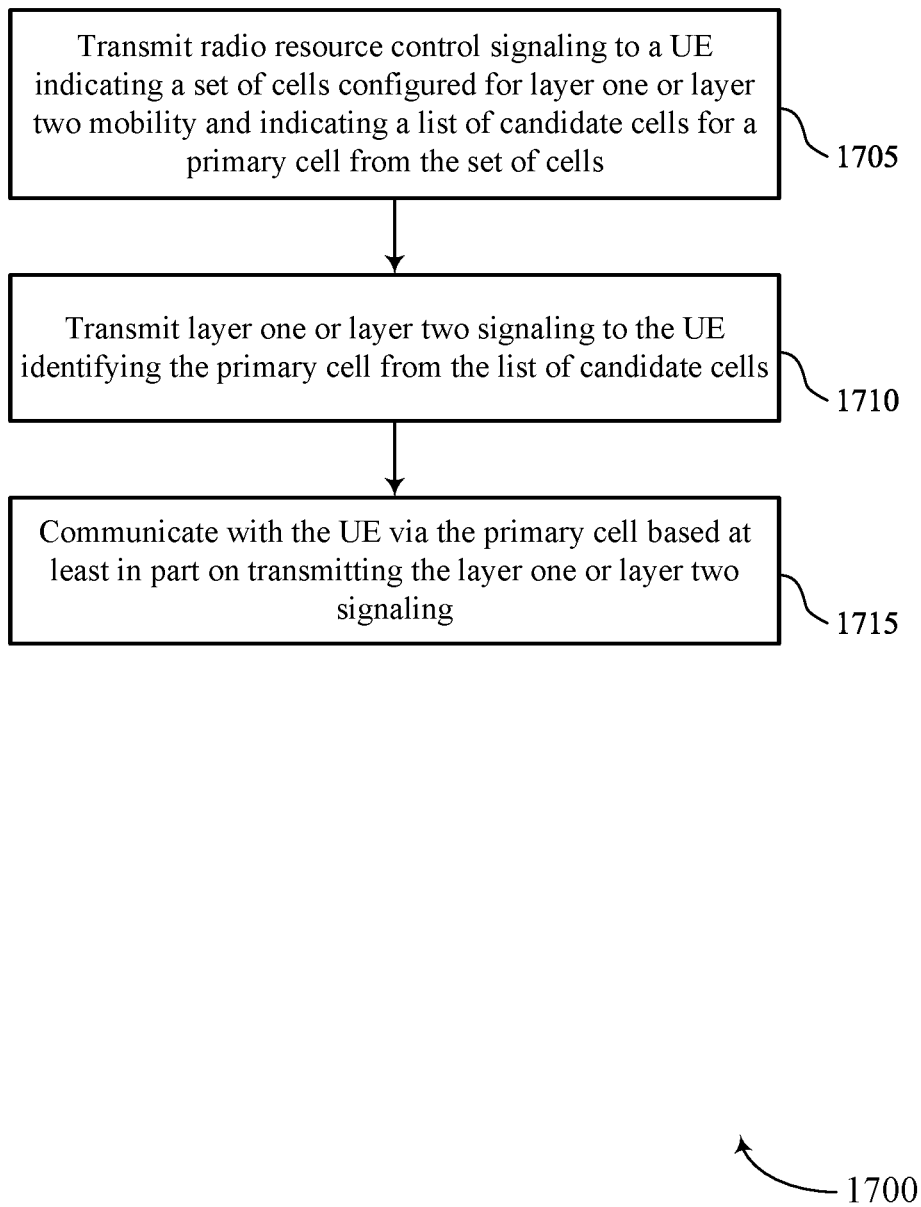

FIG. 17 shows a flowchart illustrating a method 1700 that supports PCell and PSCell management for cells within an activated cell set in accordance with aspects of the present disclosure. The operations of the method 1700 may be implemented by a base station or its components as described herein. For example, the operations of the method 1700 may be performed by a base station 105 as described with reference to FIGS. 1 through 7 and 12 through 15. In some examples, a base station may execute a set of instructions to control the functional elements of the base station to perform the described functions. Additionally, or alternatively, the base station may perform aspects of the described functions using special-purpose hardware.

At 1705, the method may include transmitting radio resource control signaling to a UE indicating a set of cells configured for layer one or layer two mobility and indicating a list of candidate cells for a primary cell from the set of cells. The operations of 1705 may be performed in accordance with examples as disclosed herein. In some examples, aspects of the operations of 1705 may be performed by a L3 signaling manager 1425 as described with reference to FIG. 14.

At 1710, the method may include transmitting layer one or layer two signaling to the UE identifying the primary cell from the list of candidate cells. The operations of 1710 may be performed in accordance with examples as disclosed herein. In some examples, aspects of the operations of 1710 may be performed by a L1/L2 signaling manager 1430 as described with reference to FIG. 14.

At 1715, the method may include communicating with the UE via the primary cell based on transmitting the layer one or layer two signaling. The operations of 1715 may be performed in accordance with examples as disclosed herein. In some examples, aspects of the operations of 1715 may be performed by a PCell manager 1435 as described with reference to FIG. 14.

Figure 18:
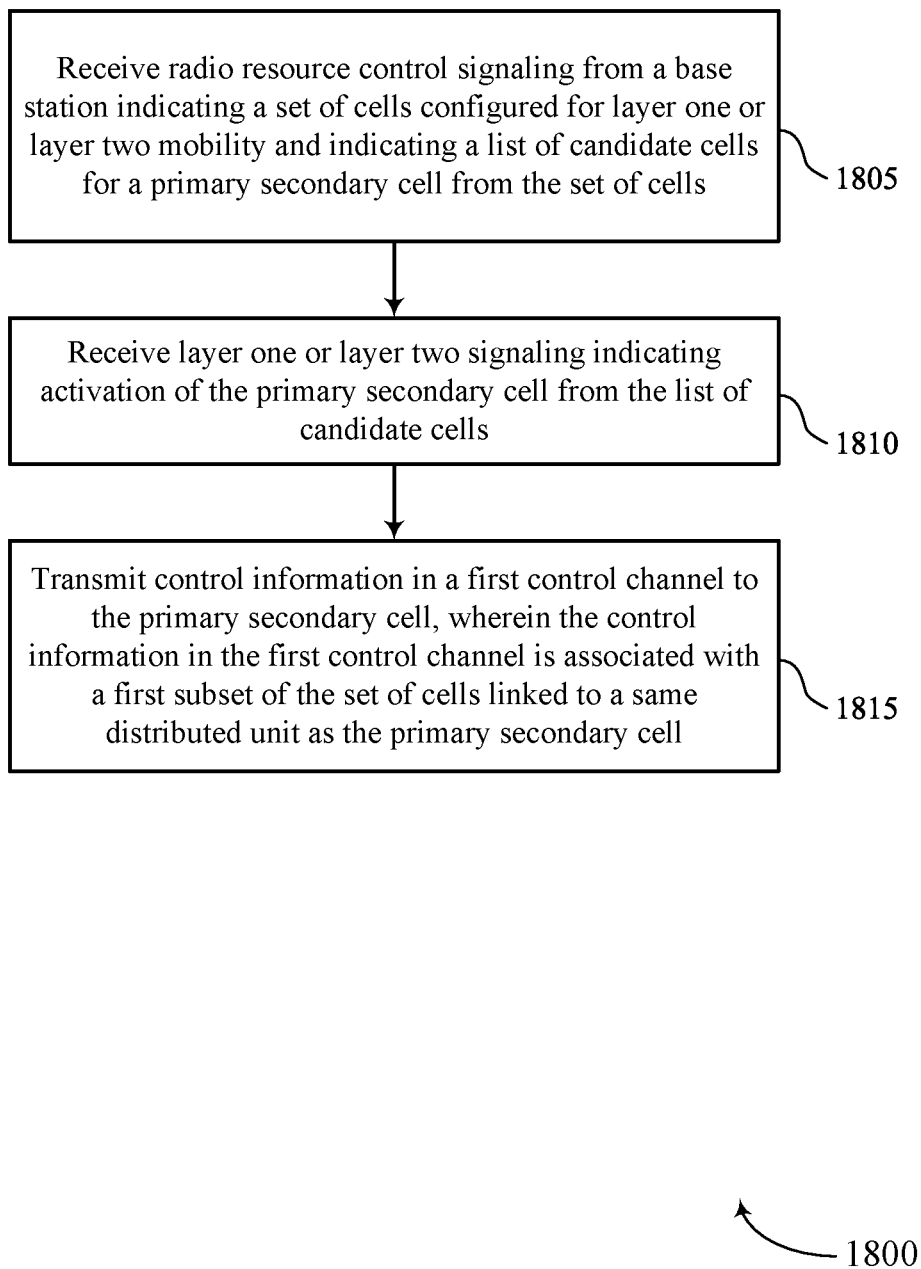

FIG. 18 shows a flowchart illustrating a method 1800 that supports PCell and PSCell management for cells within an activated cell set in accordance with aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1805, the method may include receiving radio resource control signaling from a base station indicating a set of cells configured for layer one or layer two mobility and indicating a list of candidate cells for a primary secondary cell from the set of cells. The operations of 1805 may be performed in accordance with examples as disclosed herein. In some examples, aspects of the operations of 1805 may be performed by a L3 signaling manager 1025 as described with reference to FIG. 10.

At 1810, the method may include receiving layer one or layer two signaling indicating activation of the primary secondary cell from the list of candidate cells. The operations of 1810 may be performed in accordance with examples as disclosed herein. In some examples, aspects of the operations of 1810 may be performed by a L1/L2 signaling manager 1030 as described with reference to FIG. 10.

At 1815, the method may include transmitting control information in a first control channel to the primary secondary cell, where the control information in the first control channel is associated with a first subset of the set of cells linked to a same distributed unit as the primary secondary cell. The operations of 1815 may be performed in accordance with examples as disclosed herein. In some examples, aspects of the operations of 1815 may be performed by a PSCell manager 1040 as described with reference to FIG. 10.

Figure 19:
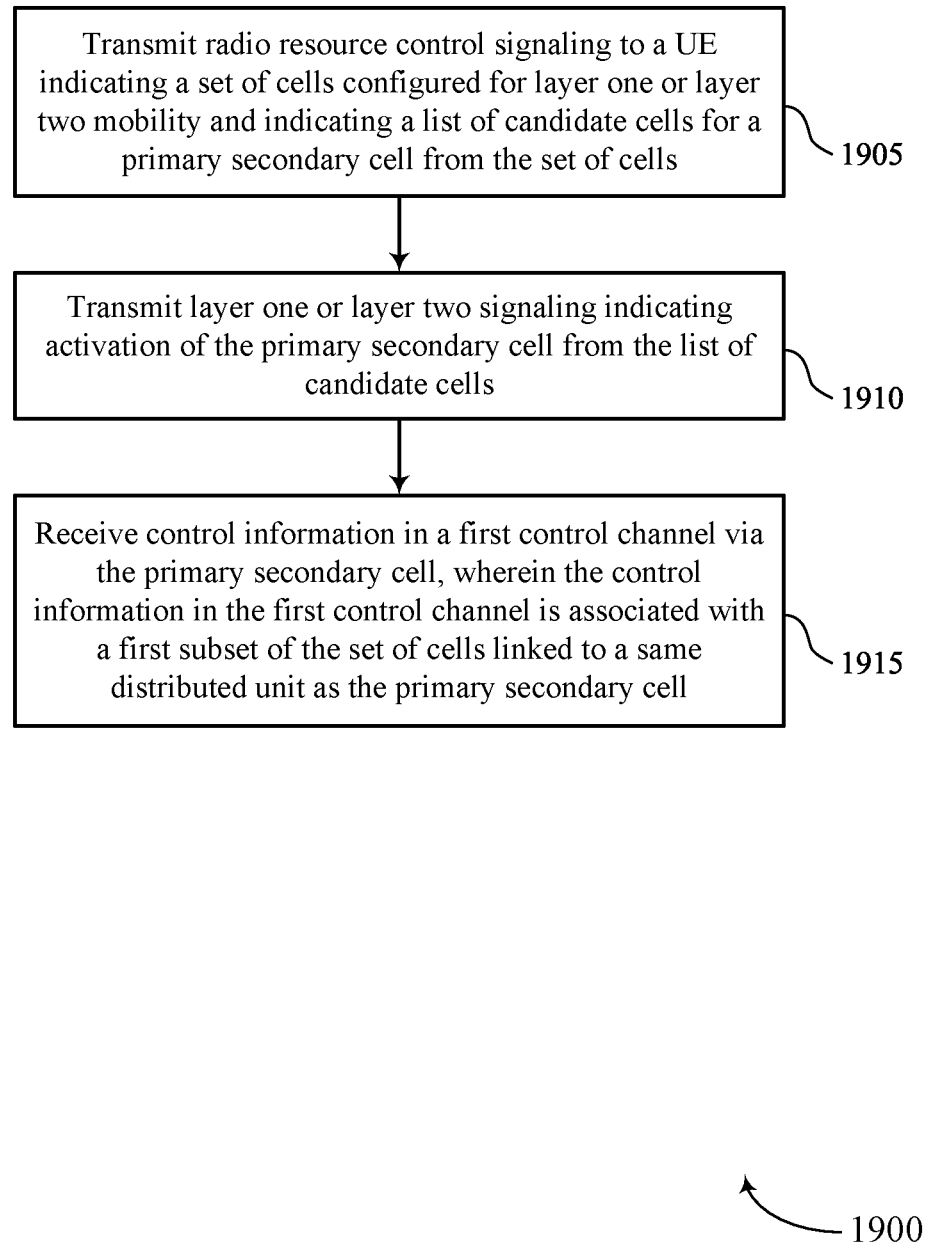

FIG. 19 shows a flowchart illustrating a method 1900 that supports PCell and PSCell management for cells within an activated cell set in accordance with aspects of the present disclosure. The operations of the method 1900 may be implemented by a base station or its components as described herein. For example, the operations of the method 1900 may be performed by a base station 105 as described with reference to FIGS. 1 through 7 and 12 through 15. In some examples, a base station may execute a set of instructions to control the functional elements of the base station to perform the described functions. Additionally, or alternatively, the base station may perform aspects of the described functions using special-purpose hardware.

At 1905, the method may include transmitting radio resource control signaling to a UE indicating a set of cells configured for layer one or layer two mobility and indicating a list of candidate cells for a primary secondary cell from the set of cells. The operations of 1905 may be performed in accordance with examples as disclosed herein. In some examples, aspects of the operations of 1905 may be performed by a L3 signaling manager 1425 as described with reference to FIG. 14.

At 1910, the method may include transmitting layer one or layer two signaling indicating activation of the primary secondary cell from the list of candidate cells. The operations of 1910 may be performed in accordance with examples as disclosed herein. In some examples, aspects of the operations of 1910 may be performed by a L1/L2 signaling manager 1430 as described with reference to FIG. 14.

At 1915, the method may include receiving control information in a first control channel via the primary secondary cell, where the control information in the first control channel is associated with a first subset of the set of cells linked to a same distributed unit as the primary secondary cell. The operations of 1915 may be performed in accordance with examples as disclosed herein. In some examples, aspects of the operations of 1915 may be performed by a PSCell manager 1440 as described with reference to FIG. 14.

The following provides an overview of aspects of the present disclosure:

Aspect 1: A method for wireless communication at a UE, comprising: receiving radio resource control signaling from a base station indicating a set of cells configured for layer one or layer two mobility and indicating a list of candidate cells for a primary cell from the set of cells; receiving layer one or layer two signaling from the base station identifying the primary cell from the list of candidate cells; and communicating with the primary cell based at least in part on receiving the layer one or layer two signaling.

Aspect 2: The method of aspect 1, further comprising: receiving, in the radio resource control signaling, an indication of a primary distributed unit that supports the primary cell, wherein receiving the layer one or layer two signaling identifying the primary cell comprises: receiving, from the primary distributed unit, the layer one or layer two signaling identifying the primary cell from the list of candidate cells.

Aspect 3: The method of any of aspects 1 through 2, further comprising: receiving, in the layer one or layer two signaling, an indication of a primary distributed unit that supports the primary cell, wherein receiving the layer one or layer two signaling identifying the primary cell comprises: receiving, from the primary distributed unit, the layer one or layer two signaling identifying the primary cell from the list of candidate cells.

Aspect 4: The method of any of aspects 1 through 3, wherein the primary cell comprises a first primary cell, and the layer one or layer two signaling comprises first layer one or layer two signaling, the method further comprising: receiving second layer one or layer two signaling triggering a handover to a second primary cell that is a member of the set of cells configured for layer one or layer two mobility; and performing the handover to the second primary cell based at least in part on receiving the second layer one or layer two signaling.

Aspect 5: The method of any of aspects 1 through 4, wherein the primary cell comprises a first primary cell, the method further comprising: receiving layer three signaling triggering a handover to a second primary cell that is a non-member of the set of cells configured for layer one or layer two mobility; and performing the handover to the second primary cell based at least in part on receiving the layer three signaling.

Aspect 6: The method of aspect 5, wherein the radio resource control signaling comprises first radio resource control signaling, the method further comprising: receiving second radio resource control signaling indicating an updated set of cells configured for layer one or layer two mobility based at least in part on performing the handover.

Aspect 7: The method of any of aspects 1 through 6, wherein a first cell in the set of cells configured for layer one or layer two mobility is supported by a first distributed unit at the base station; a second cell in the set of cells configured for layer one or layer two mobility is supported by a second distributed unit at the base station; and the first distributed unit and the second distributed unit are supported by a same central unit at the base station.

Aspect 8: A method for wireless communication at a base station, comprising: transmitting radio resource control signaling to a UE indicating a set of cells configured for layer one or layer two mobility and indicating a list of candidate cells for a primary cell from the set of cells; transmitting layer one or layer two signaling to the UE identifying the primary cell from the list of candidate cells; and communicating with the UE via the primary cell based at least in part on transmitting the layer one or layer two signaling.

Aspect 9: The method of aspect 8, further comprising: transmitting, in the radio resource control signaling, an indication of a primary distributed unit that supports the primary cell, wherein transmitting the layer one or layer two signaling identifying the primary cell comprises: transmitting, via the primary distributed unit to the UE, the layer one or layer two signaling identifying the primary cell from the list of candidate cells.

Aspect 10: The method of any of aspects 8 through 9, further comprising: exchanging signaling between a plurality of distributed units at the base station; and identifying a primary distributed unit for the UE based at least in part on the exchanging, wherein the primary distributed unit supports the primary cell.

Aspect 11: The method of aspect 10, wherein the signaling exchanged between the plurality of distributed units at the base station comprises layer one measurements, a coverage area of each distributed unit, a predicted position of the UE, a load of each distributed unit, or a combination thereof.

Aspect 12: The method of any of aspects 10 through 11, further comprising: transmitting, in the layer one or layer two signaling to the UE, an indication of the primary distributed unit that supports the primary cell, wherein transmitting the layer one or layer two signaling identifying the primary cell comprises: transmitting, via the primary distributed unit to the UE, the layer one or layer two signaling identifying the primary cell from the list of candidate cells.

Aspect 13: The method of any of aspects 8 through 12, wherein the primary cell comprises a first primary cell, and the layer one or layer two signaling comprises first layer one or layer two signaling, the method further comprising: transmitting second layer one or layer two signaling triggering a handover to a second primary cell that is a member of the set of cells configured for layer one or layer two mobility.

Aspect 14: The method of any of aspects 8 through 13, wherein the primary cell comprises a first primary cell, the method further comprising: transmitting layer three signaling triggering a handover to a second primary cell that is a non-member of the set of cells configured for layer one or layer two mobility.

Aspect 15: The method of aspect 14, wherein the radio resource control signaling comprises first radio resource control signaling, the method further comprising: transmitting second radio resource control signaling indicating an updated set of cells configured for layer one or layer two mobility based at least in part on triggering the handover.

Aspect 16: The method of any of aspects 8 through 15, wherein a first cell in the set of cells configured for layer one or layer two mobility is supported by a first distributed unit at the base station; a second cell in the set of cells configured for layer one or layer two mobility is supported by a second distributed unit at the base station; and the first distributed unit and the second distributed unit are supported by a same central unit at the base station.

Aspect 17: A method for wireless communication at a UE, comprising: receiving radio resource control signaling from a base station indicating a set of cells configured for layer one or layer two mobility and indicating a list of candidate cells for a primary secondary cell from the set of cells; receiving layer one or layer two signaling indicating activation of the primary secondary cell from the list of candidate cells; and transmitting control information in a first control channel to the primary secondary cell, wherein the control information in the first control channel is associated with a first subset of the set of cells linked to a same distributed unit as the primary secondary cell.

Aspect 18: The method of aspect 17, wherein receiving the layer one or layer two signaling indicating activation of the primary secondary cell comprises: receiving layer one or layer two signaling identifying the primary secondary cell from the list of candidate cells.

Aspect 19: The method of any of aspects 17 through 18, further comprising: identifying the primary secondary cell from the list of candidate cells based at least in part on one or more rules.

Aspect 20: The method of aspect 19, wherein the one or more rules indicate that the primary secondary cell corresponds to a cell in the list of candidate cells with a defined cell identifier or a defined priority.

Aspect 21: The method of any of aspects 17 through 20, further comprising: transmitting control information in a second control channel to another cell in the set of cells, wherein the control information in the second control channel is associated with a second subset of the set of cells linked to the same distributed unit as the primary secondary cell.

Aspect 22: The method of aspect 21, wherein the first subset of the set of cells for which control information is transmitted in the first control channel overlaps with the second subset of the set of cells for which control information is transmitted in the second control channel.

Aspect 23: The method of any of aspects 21 through 22, wherein the first subset of the set of cells for which control information is transmitted in the first control channel is non-overlapping with the second subset of the set of cells for which control information is transmitted in the second control channel.

Aspect 24: A method for wireless communication at a base station, comprising: transmitting radio resource control signaling to a UE indicating a set of cells configured for layer one or layer two mobility and indicating a list of candidate cells for a primary secondary cell from the set of cells; transmitting layer one or layer two signaling indicating activation of the primary secondary cell from the list of candidate cells; and receiving control information in a first control channel via the primary secondary cell, wherein the control information in the first control channel is associated with a first subset of the set of cells linked to a same distributed unit as the primary secondary cell.

Aspect 25: The method of aspect 24, further comprising: transmitting layer one or layer two signaling identifying the primary secondary cell from the list of candidate cells.

Aspect 26: The method of any of aspects 24 through 25, wherein identifying the primary secondary cell from the list of candidate cells comprises: identifying the primary secondary cell from the list of candidate cells based at least in part on one or more rules.

Aspect 27: The method of aspect 26, wherein the one or more rules indicate that the primary secondary cell corresponds to a cell in the list of candidate cells with a defined cell identifier or a defined priority.

Aspect 28: The method of any of aspects 24 through 27, further comprising: receiving control information in a second control channel via another cell in the set of cells, wherein the control information in the second control channel is associated with a second subset of the set of cells linked to the same distributed unit as the primary secondary cell.

Aspect 29: The method of aspect 28, wherein the first subset of the set of cells for which control information is transmitted in the first control channel overlaps with the second subset of the set of cells for which control information is transmitted in the second control channel.

Aspect 30: The method of any of aspects 28 through 29, wherein the first subset of the set of cells for which control information is transmitted in the first control channel is non-overlapping with the second subset of the set of cells for which control information is transmitted in the second control channel.

Aspect 31: An apparatus for wireless communication at a UE, comprising a processor; memory coupled with the processor; and instructions stored in the memory and executable by the processor to cause the apparatus to perform a method of any of aspects 1 through 7.

Aspect 32: An apparatus for wireless communication at a UE, comprising at least one means for performing a method of any of aspects 1 through 7.

Aspect 33: A non-transitory computer-readable medium storing code for wireless communication at a UE, the code comprising instructions executable by a processor to perform a method of any of aspects 1 through 7.

Aspect 34: An apparatus for wireless communication at a base station, comprising a processor; memory coupled with the processor; and instructions stored in the memory and executable by the processor to cause the apparatus to perform a method of any of aspects 8 through 16.

Aspect 35: An apparatus for wireless communication at a base station, comprising at least one means for performing a method of any of aspects 8 through 16.

Aspect 36: A non-transitory computer-readable medium storing code for wireless communication at a base station, the code comprising instructions executable by a processor to perform a method of any of aspects 8 through 16.

Aspect 37: An apparatus for wireless communication at a UE, comprising a processor; memory coupled with the processor; and instructions stored in the memory and executable by the processor to cause the apparatus to perform a method of any of aspects 17 through 23.

Aspect 38: An apparatus for wireless communication at a UE, comprising at least one means for performing a method of any of aspects 17 through 23.

Aspect 39: A non-transitory computer-readable medium storing code for wireless communication at a UE, the code comprising instructions executable by a processor to perform a method of any of aspects 17 through 23.

Aspect 40: An apparatus for wireless communication at a base station, comprising a processor; memory coupled with the processor; and instructions stored in the memory and executable by the processor to cause the apparatus to perform a method of any of aspects 24 through 30.

Aspect 41: An apparatus for wireless communication at a base station, comprising at least one means for performing a method of any of aspects 24 through 30.

Aspect 42: A non-transitory computer-readable medium storing code for wireless communication at a base station, the code comprising instructions executable by a processor to perform a method of any of aspects 24 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving radio resource control signaling from a base station indicating a set of cells configured for layer one or layer two mobility and indicating a list of candidate cells for a primary cell from the set of cells;
   receiving layer one or layer two signaling from the base station identifying the primary cell from the list of candidate cells; and
   communicating with the primary cell based at least in part on receiving the layer one or layer two signaling.

2. The method of claim 1, further comprising:
   receiving, in the radio resource control signaling, an indication of a primary distributed unit that supports the primary cell, wherein receiving the layer one or layer two signaling identifying the primary cell comprises:
   receiving, from the primary distributed unit, the layer one or layer two signaling identifying the primary cell from the list of candidate cells.

3. The method of claim 1, further comprising:
   receiving, in the layer one or layer two signaling, an indication of a primary distributed unit that supports the primary cell, wherein receiving the layer one or layer two signaling identifying the primary cell comprises:
   receiving, from the primary distributed unit, the layer one or layer two signaling identifying the primary cell from the list of candidate cells.

4. The method of claim 1, wherein the primary cell comprises a first primary cell, and the layer one or layer two signaling comprises first layer one or layer two signaling, the method further comprising:
   receiving second layer one or layer two signaling triggering a handover to a second primary cell that is a member of the set of cells configured for layer one or layer two mobility; and
   performing the handover to the second primary cell based at least in part on receiving the second layer one or layer two signaling.

5. The method of claim 1, wherein the primary cell comprises a first primary cell, the method further comprising:
   receiving layer three signaling triggering a handover to a second primary cell that is a non-member of the set of cells configured for layer one or layer two mobility; and
   performing the handover to the second primary cell based at least in part on receiving the layer three signaling.

6. The method of claim 5, wherein the radio resource control signaling comprises first radio resource control signaling, the method further comprising:
   receiving second radio resource control signaling indicating an updated set of cells configured for layer one or layer two mobility based at least in part on performing the handover.

7. The method of claim 1, wherein:
   a first cell in the set of cells configured for layer one or layer two mobility is supported by a first distributed unit at the base station;
   a second cell in the set of cells configured for layer one or layer two mobility is supported by a second distributed unit at the base station; and
   the first distributed unit and the second distributed unit are supported by a same central unit at the base station.

8. A method for wireless communication at a base station, comprising:
   transmitting radio resource control signaling to a user equipment (UE) indicating a set of cells configured for layer one or layer two mobility and indicating a list of candidate cells for a primary cell from the set of cells;
   transmitting layer one or layer two signaling to the UE identifying the primary cell from the list of candidate cells; and
   communicating with the UE via the primary cell based at least in part on transmitting the layer one or layer two signaling.

9. The method of claim 8, further comprising:
   transmitting, in the radio resource control signaling, an indication of a primary distributed unit that supports the primary cell, wherein transmitting the layer one or layer two signaling identifying the primary cell comprises:
   transmitting, via the primary distributed unit to the UE, the layer one or layer two signaling identifying the primary cell from the list of candidate cells.

10. The method of claim 8, further comprising:
    exchanging signaling between a plurality of distributed units at the base station; and
    identifying a primary distributed unit for the UE based at least in part on the exchanging, wherein the primary distributed unit supports the primary cell.

11. The method of claim 10, wherein the signaling exchanged between the plurality of distributed units at the base station comprises layer one measurements, a coverage area of each distributed unit, a predicted position of the UE, a load of each distributed unit, or a combination thereof.

12. The method of claim 10, further comprising:
    transmitting, in the layer one or layer two signaling to the UE, an indication of the primary distributed unit that supports the primary cell, wherein transmitting the layer one or layer two signaling identifying the primary cell comprises:
  transmitting, via the primary distributed unit to the UE, the layer one or layer two signaling identifying the primary cell from the list of candidate cells.

13. The method of claim 8, wherein the primary cell comprises a first primary cell, and the layer one or layer two signaling comprises first layer one or layer two signaling, the method further comprising:
  transmitting second layer one or layer two signaling triggering a handover to a second primary cell that is a member of the set of cells configured for layer one or layer two mobility.

14. The method of claim 8, wherein the primary cell comprises a first primary cell, the method further comprising:
  transmitting layer three signaling triggering a handover to a second primary cell that is a non-member of the set of cells configured for layer one or layer two mobility.

15. The method of claim 14, wherein the radio resource control signaling comprises first radio resource control signaling, the method further comprising:
  transmitting second radio resource control signaling indicating an updated set of cells configured for layer one or layer two mobility based at least in part on triggering the handover.

16. The method of claim 8, wherein:
  a first cell in the set of cells configured for layer one or layer two mobility is supported by a first distributed unit at the base station;
  a second cell in the set of cells configured for layer one or layer two mobility is supported by a second distributed unit at the base station; and
  the first distributed unit and the second distributed unit are supported by a same central unit at the base station.

17. A method for wireless communication at a user equipment (UE), comprising:
  receiving radio resource control signaling from a base station indicating a set of cells configured for layer one or layer two mobility and indicating a list of candidate cells for a primary secondary cell from the set of cells;
  receiving layer one or layer two signaling indicating activation of the primary secondary cell from the list of candidate cells; and
  transmitting control information in a first control channel to the primary secondary cell, wherein the control information in the first control channel is associated with a first subset of the set of cells linked to a same distributed unit as the primary secondary cell.

18. The method of claim 17, wherein receiving layer one or layer two signaling indicating activation of the primary secondary cell comprises:
  receiving layer one or layer two signaling identifying the primary secondary cell from the list of candidate cells.

19. The method of claim 17, further comprising:
  identifying the primary secondary cell from the list of candidate cells based at least in part on one or more rules.

20. The method of claim 19, wherein the one or more rules indicate that the primary secondary cell corresponds to a cell in the list of candidate cells with a defined cell identifier or a defined priority.

21. The method of claim 17, further comprising:
  transmitting control information in a second control channel to another cell in the set of cells, wherein the control information in the second control channel is associated with a second subset of the set of cells linked to the same distributed unit as the primary secondary cell.

22. The method of claim 21, wherein the first subset of the set of cells for which control information is transmitted in the first control channel overlaps with the second subset of the set of cells for which control information is transmitted in the second control channel.

23. The method of claim 21, wherein the first subset of the set of cells for which control information is transmitted in the first control channel is non-overlapping with the second subset of the set of cells for which control information is transmitted in the second control channel.

24. A method for wireless communication at a base station, comprising:
  transmitting radio resource control signaling to a user equipment (UE) indicating a set of cells configured for layer one or layer two mobility and indicating a list of candidate cells for a primary secondary cell from the set of cells;
  transmitting layer one or layer two signaling indicating activation of the primary secondary cell from the list of candidate cells; and
  receiving control information in a first control channel via the primary secondary cell, wherein the control information in the first control channel is associated with a first subset of the set of cells linked to a same distributed unit as the primary secondary cell.

25. The method of claim 24, wherein transmitting layer one or layer two signaling indicating activation of the primary secondary cell comprises:
  transmitting layer one or layer two signaling identifying the primary secondary cell from the list of candidate cells.

26. The method of claim 24, further comprising:
  identifying the primary secondary cell from the list of candidate cells based at least in part on one or more rules.

27. The method of claim 26, wherein the one or more rules indicate that the primary secondary cell corresponds to a cell in the list of candidate cells with a defined cell identifier or a defined priority.

28. The method of claim 24, further comprising:
  receiving control information in a second control channel via another cell in the set of cells, wherein the control information in the second control channel is associated with a second subset of the set of cells linked to the same distributed unit as the primary secondary cell.

29. The method of claim 28, wherein the first subset of the set of cells for which control information is transmitted in the first control channel overlaps with the second subset of the set of cells for which control information is transmitted in the second control channel.

30. The method of claim 28, wherein the first subset of the set of cells for which control information is transmitted in the first control channel is non-overlapping with the second subset of the set of cells for which control information is transmitted in the second control channel.

* * * * *